United States Patent
Zhang et al.

(10) Patent No.: US 12,010,176 B2
(45) Date of Patent: Jun. 11, 2024

(54) METHOD FOR CREATING AND EXECUTING ACTION RESOURCE, AND ELECTRONIC DEVICE

(71) Applicant: BOE TECHNOLOGY GROUP CO., LTD., Beijing (CN)

(72) Inventors: Qian Zhang, Beijing (CN); Junjie Zhao, Beijing (CN); Jing Su, Beijing (CN); Yanqiu Zhao, Beijing (CN); Xinan Wang, Beijing (CN); Shaobei Chen, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 185 days.

(21) Appl. No.: 17/642,976

(22) PCT Filed: Sep. 14, 2020

(86) PCT No.: PCT/CN2020/115002
§ 371 (c)(1),
(2) Date: Mar. 15, 2022

(87) PCT Pub. No.: WO2021/052284
PCT Pub. Date: Mar. 25, 2021

(65) Prior Publication Data
US 2022/0334841 A1    Oct. 20, 2022

(30) Foreign Application Priority Data
Sep. 20, 2019   (CN) .......................... 201910893658.2

(51) Int. Cl.
*H04L 67/12* (2022.01)
*G06F 9/50* (2006.01)

(52) U.S. Cl.
CPC .............. *H04L 67/12* (2013.01); *G06F 9/505* (2013.01); *G06F 9/5055* (2013.01)

(58) Field of Classification Search
CPC ......... H04L 67/12; H04L 65/40; G06F 9/505; G06F 9/5055; G06F 9/542; G05B 15/02; G05B 19/418; H04W 24/10; Y02P 90/02
See application file for complete search history.

(56) References Cited

U.S. PATENT DOCUMENTS

| 2018/0227828 A1 | 8/2018 | Sirotkin et al. |
| 2019/0349034 A1 | 11/2019 | Manolakos et al. |

(Continued)

FOREIGN PATENT DOCUMENTS

| CN | 104865837 A | 8/2015 |
| CN | 107852666 A | 3/2018 |

(Continued)

OTHER PUBLICATIONS

International search report of PCT application No. PCT/CN2020/115002 dated Dec. 17, 2020.

*Primary Examiner* — Benjamin M Thieu
(74) *Attorney, Agent, or Firm* — Lippes Mathias LLP

(57) ABSTRACT

Provided is a method for creating an action resource. The method includes: receiving a first creation request, wherein the first creation request includes a first target resource; and creating a first action resource based on the first creation request, wherein the first action resource is configured to trigger a first action for the first target resource; wherein creating the first action resource includes: creating a first action status attribute used for the first action resource, wherein the first action status attribute indicates a status of the first action.

17 Claims, 14 Drawing Sheets

(56) References Cited

U.S. PATENT DOCUMENTS

2020/0304580 A1  9/2020  Kou et al.
2021/0152266 A1  5/2021  Sakaue

FOREIGN PATENT DOCUMENTS

| CN | 109871218 A | 6/2019 | |
|----|----|----|----|
| CN | 109901924 A | 6/2019 | |
| CN | 110249656 A | 9/2019 | |
| IN | 108965400 A | 12/2018 | |
| JP | 6523589 B1 | 6/2019 | |
| WO | WO-2016122023 A1 * | 8/2016 | ............. H04L 41/00 |
| WO | 2019046214 A1 | 3/2019 | |

* cited by examiner

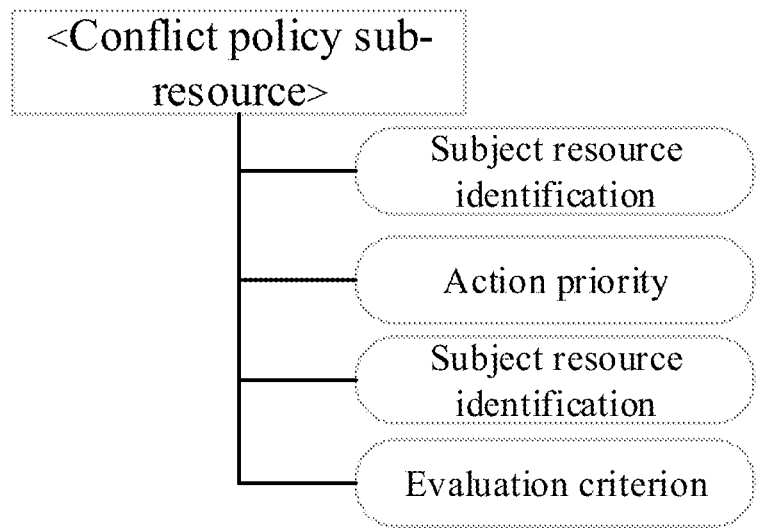

FIG. 8B

| | |
|---|---|
| S301 | Determining a first action resource, wherein the first action resource is configured to trigger a first action for the first target resource, the first action resource includes a first action status attribute, and the first action status attribute indicates a status of the first action |
| S302 | Triggering the first action for the first target resource |
| S303 | Setting an attribute value of the first action status attribute to a first set value in response to the first action being triggered |

FIG. 9

METHOD FOR CREATING AND EXECUTING ACTION RESOURCE, AND ELECTRONIC DEVICE

CROSS-REFERENCE TO RELATED APPLICATION

This application is a 371 of application No. PCT/CN2020/115002, filed on Sep. 14, 2020, which claims priority to the Chinese Patent Application No. 201910893658.2, filed on Sep. 20, 2019, the disclosures of which are herein incorporated by reference in their entirety.

TECHNICAL FIELD

The present disclosure relates to a method for creating an action resource, a method for executing an action, and an electronic device.

BACKGROUND

With the rapid development of the Internet of things technology in various application fields, more and more devices are connected to the Internet of things, and various new application fields, such as the smart home, the smart traffic, the smart health, and the like are raised. Internet of everything (IoE) is a development trend of the Internet of things. In an Internet of things system, an application entity, as an application, may deploy a service on a common service entity as a service platform. Upon deployment of the service of the application on the service platform, in implementation of the service, the application itself does not need to be involved, but an operation of the service may be directly performed on the service platform. The service platform may provide common services for a plurality of different applications from different application providers, thereby achieving inter-networking among the plurality of different applications by the service platform, and achieving the IoE.

SUMMARY

At least one embodiment of the present disclosure provides a method for creating an action resource. The method includes: receiving a first creation request, wherein the first creation request includes a first target resource; and creating a first action resource based on the first creation request, wherein the first action resource is configured to trigger a first action for the first target resource; wherein creating the first action resource includes: creating a first action status attribute for the first action resource, wherein the first action status attribute indicates a status of the first action.

Exemplarily, in the method according to one embodiment of the present disclosure, creating the first action resource further includes: creating a first action time attribute for the first action resource; wherein the first action time attribute indicates a time parameter related to the first action.

Exemplarily, the method according to one embodiment of the present disclosure further includes: receiving a second creation request, wherein the second creation request includes a second target resource; and creating a second action resource based on the second creation request, wherein the second action resource is configured to trigger a second action for the second target resource, the second action being triggered for the second target resource in the case that a second trigger condition is satisfied; wherein creating the second action resource includes: creating a second action status attribute for the second action resource, wherein the second action status attribute indicates a status of the second action.

Exemplarily, in the method according to one embodiment of the present disclosure, creating the second action resource further includes: creating a second action time attribute for the second action resource; wherein the second action time attribute indicates a time parameter related to the second action.

Exemplarily, in the method according to one embodiment of the present disclosure, the first target resource and the second target resource are the same, and the first action and the second action are in conflict with each other.

Exemplarily, in the method according to one embodiment of the present disclosure, the first creation request further includes dependency resource information; and creating the first action resource further includes: creating a first dependency sub-resource for the first action resource based on the dependency resource information, wherein the first dependency sub-resource includes a first dependency condition, the first dependency condition being related to the second action status attribute, and the first action is triggered for the first target resource in the case that a first trigger condition and the first dependency condition are simultaneously satisfied; or creating a second dependency sub-resource for the first action resource based on the dependency resource information, wherein the second dependency sub-resource includes a second dependency condition, the second dependency condition being related to the second action time attribute, and the first action is triggered for the first target resource in the case that the first trigger condition and the second dependency condition are simultaneously satisfied; or creating the first dependency sub-resource and the second dependency sub-resource for the first action resource based on the dependency resource information, wherein the first dependency sub-resource includes the first dependency condition, the second dependency sub-resource includes the second dependency condition; and the first dependency condition is related to the second action status attribute, the second dependency condition is related to the second action time attribute, and the first action is triggered for the first target resource in the case that at least one of the first dependency condition and the second dependency condition, and the first trigger condition are simultaneously satisfied.

Exemplarily, in the method according to one embodiment of the present disclosure, creating the first action resource further includes: creating a first opposite action attribute and a first status control attribute for the first action resource; and creating the second action resource further includes: creating a second opposite action attribute and a second status control attribute for the second action resource, wherein the first opposite action attribute indicates an identification code of the second action resource, and the second opposite action attribute indicates an identification code of the first action resource; and the first status control attribute indicates whether to change an attribute value of the first action status attribute or an attribute value of the second action status attribute, and the second status control attribute indicates whether to change an attribute value of the second action status attribute or an attribute value of the first action status attribute.

Exemplarily, in the method according to one embodiment of the present disclosure, the first dependency condition is that the attribute value of the second action status attribute and a first set value satisfy a first preset logical relationship, the first set value being active or inactive; and the second dependency condition is that an attribute value of the second action time attribute and a preset action time satisfy a second preset logical relationship.

Exemplarily, in the method according to one embodiment of the present disclosure, the first creation request further includes conflict policy resource information; and creating the first action resource further includes: creating a conflict policy sub-resource for the first action resource based on the conflict policy resource information.

Exemplarily, in the method according to one embodiment of the present disclosure, creating the first action resource further includes: creating a first dependency sub-resource for the first action resource in the case that the second target resource, the second action, and the conflict policy sub-resource satisfy a matching condition, wherein the first dependency sub-resource includes a first dependency condition, the first dependency condition being related to the second action status attribute, and the first action is triggered for the first target resource in the case that the first dependency condition and the first trigger condition are simultaneously satisfied; or creating the first action resource further includes: creating a second dependency sub-resource for the first action resource in the case that the second target resource, the second action, and the conflict policy sub-resource satisfy the matching condition, wherein the second dependency sub-resource includes a second dependency condition, the second dependency condition being related to the second action time attribute, and the first action is triggered for the first target resource in the case that the second dependency condition and the first trigger condition are simultaneously satisfied; or creating the first action resource further includes: creating the first dependency sub-resource and the second dependency sub-resource for the first action resource in the case that the second target resource, the second action, and the conflict policy sub-resource satisfy the matching condition, wherein the first dependency sub-resource includes the first dependency condition, the first dependency condition being related to the second action status attribute, and the second dependency sub-resource includes the second dependency condition, the second dependency condition being related to the second action time attribute, the first action is triggered for the first target resource in the case that at least one of the first dependency condition and the second dependency condition, and the first trigger condition are simultaneously satisfied.

Exemplarily, in the method according to one embodiment of the present disclosure, creating the conflict policy sub-resource for the first action resource includes: creating a conflict target resource identification attribute and a conflict execution method attribute for the first action resource, wherein the conflict target resource identification attribute indicates an identification code of the first target resource, the conflict execution method attribute indicates an action conflicting with the first action; and satisfying a matching condition is that an identification code of the second target resource is the same as the conflict target resource identification attribute, and the second action is the same as the action represented by the conflict execution method attribute.

Exemplarily, in the method according to one embodiment of the present disclosure, creating the conflict policy sub-resources for the first action resource further includes: creating a conflict status attribute for the first action resource; wherein an attribute value of the conflict status attribute includes a first set value or a second set value.

Exemplarily, in the method according to one embodiment of the present disclosure, the attribute value of the conflict status attribute is the first set value, and the first dependency condition is that an attribute value of the second action status attribute and the first set value satisfy a first preset logical relationship, the first set value being active or inactive; and the second action resource further includes a second action time attribute, and the second dependency condition is that an attribute value of the second action time attribute and a preset action time satisfy a second preset logical relationship.

Exemplarily, in the method according to one embodiment of the present disclosure, creating the first action resource further includes creating a first status automatic control time attribute for the first action resource, wherein an attribute value of the first action status attribute includes a first set value and a second set value, the first set value and the second set value being opposite to each other, and the first status automatic control time indicates changing the attribute value of the first action status attribute from the first set value to the second set value in the case that the attribute value of the first action status attribute is the first set value, and an attribute value of the first action time attribute is greater than or equal to an attribute value of the first status automatic control time attribute.

Exemplarily, in the method according to one embodiment of the present disclosure, creating the first action resource further includes: creating a first status automatic control time attribute for the first action resource; wherein an attribute value of the first action status attribute includes a first set value and a second set value, the first set value and the second set value being opposite to each other; and the first status automatic control time indicates changing the attribute value of the first action status attribute from the first set value to the second set value in the case that the attribute value of the first action status attribute is the first set value, and an attribute value of the first status automatic control time attribute is equal to 0.

At least one embodiment of the present disclosure also provides a method for executing an action. The method includes: determining a first action resource, wherein the first action resource is configured to trigger a first action for a first target resource, and the first action resource includes a first action status attribute, wherein the first action status attribute indicates a status of the first action; triggering the first action for the first target resource; and setting an attribute value of the first action status attribute to a first set value in response to triggering the first action.

Exemplarily, in the method according to one embodiment of the present disclosure, triggering the first action for the first target resource includes: receiving a first data resource; and triggering the first action for the first target resource in the case that the first data resource satisfies a first trigger condition.

Exemplarily, in the method according to one embodiment of the present disclosure, the first action resource further includes a first action time attribute indicating a time parameter related to the first action; and the execution method further includes: setting an attribute value of the first action time attribute in response to triggering the first action.

Exemplarily, in the method according to one embodiment of the present disclosure, the first action resource further includes a first status automatic control time attribute; and the method further includes: acquiring an attribute value of the first action time attribute; and determining whether the attribute value of the first action time attribute is greater than or equal to an attribute value of the first status automatic control time attribute, and changing an attribute value of the first action status attribute from the first set value to a second set value in the case that the attribute value of the first action time attribute is greater than or equal to the attribute value of the first status automatic control time attribute, wherein the first set value and the second set value are opposite to each other.

Exemplarily, in the method according to one embodiment of the present disclosure, the first action resource further includes a first dependency sub-resource, the first dependency sub-resource including a first dependency condition, and triggering the first action for the first target resource includes: receiving a first data resource; acquiring a second action status attribute of a second action resource, wherein the second action resource is configured to trigger a resource of a second action for a second target resource, the second action resource includes the second action status attribute, and the second action status attribute indicates a status of the second action; and triggering the first action for the first target resource in the case that the first data resource satisfies a first trigger condition, and an attribute value of the second action status attribute satisfies the first dependency condition; or the first action resource further includes a second dependency sub-resource, the second dependency sub-resource including a second dependency condition, and triggering the first action for the first target resource includes: receiving a first data resource; acquiring a second action time attribute of a second action resource, wherein the second action resource is configured to trigger the resource of the second action for the second target resource, the second action resource includes the second action time attribute, and the second action time attribute indicates a time parameter related to the second action; and triggering the first action for the first target resource in the case that the first data resource satisfies the first trigger condition, and the attribute value of the second action status attribute satisfies the second dependency condition.

Exemplarily, in the method according to one embodiment of the present disclosure, the first action resource further includes a first dependency sub-resource and a second dependency sub-resource, the first dependency sub-resource including a first dependency condition, the second dependency sub-resource including a second dependency condition, and triggering the first action for the first target resource includes: receiving a first data resource; acquiring a second action status attribute and a second action time attribute of a second action resource, wherein the second action resource is configured to trigger a resource of a second action for a second target resource, the second action resource includes the second action status attribute and the second action time attribute, the second action status attribute indicates a status of the second action, and the second action time attribute indicates a time parameter related to the second action; triggering the first action for the first target resource in the case that the first data resource satisfies the first trigger condition, and an attribute value of the second action status attribute satisfies the first dependency condition and/or the attribute value of the second action status attribute satisfies the second dependency condition.

Exemplarily, in the method according to one embodiment of the present disclosure, the first dependency condition is that the attribute value of the second action status attribute and the first set value satisfy a first preset logical relationship, the first set value being active or inactive; and the second dependency condition is that the attribute value of the second action time attribute and a preset action time satisfy a second preset logical relationship.

Exemplarily, in the method according to one embodiment of the present disclosure, the first target resource and the second target resource are the same, and the first action and the second action conflict with each other.

Exemplarily, the method according to one embodiment of the present disclosure further includes: setting the attribute value of the second action status attribute to a second set value in response to triggering the first action, wherein the first set value and the second set value are opposite to each other; determining the second action resource; receiving a second data resource; and triggering the second action for the second target resource in the case that the second data resource satisfies a second trigger condition, and changing the attribute value of the second action status attribute from the second set value to the first set value and changing the attribute value of the first action status attribute from the first set value to the second set value in response to triggering the second action.

Exemplarily, in the method according to one embodiment of the present disclosure, the first action resource further includes a first opposite action attribute and a first status control attribute, and the second action resource further includes a second opposite action attribute and a second status control attribute; wherein the first opposite action attribute indicates an identification code of the second action resource, and the second opposite action attribute indicates an identification code of the first action resource; and prior to performing the operation of setting the attribute value of the second action status attribute to the second set value, the method further includes: determining whether an attribute value of the first status control attribute is true, performing the operation of setting the attribute value of the second action status attribute to the second set value in the case that the attribute value of the first status control attribute is determined to be true, and not performing the operation of setting the attribute value of the second action status attribute to the second set value in the case that the attribute value of the first status control attribute is determined to be not true; and prior to performing the operation of changing the attribute value of the first action status attribute from the first set value to the second set value, the method further includes: determining whether the attribute value of the second status control attribute is true, performing the operation of changing the attribute value of the first action status attribute from the first set value to the second set value in the case that the attribute value of the second status control attribute is determined to be true, and not performing the operation of changing the attribute value of the first action status attribute from the first set value to the second set value in the case that the attribute value of the second status control attribute is determined to be not true; or prior to performing the operation of setting the attribute value of the second action status attribute to the second set value, the method further includes: determining whether the attribute value of the second status control attribute is true, performing the operation of setting the attribute value of the second action status attribute to the second set value in the case that the attribute value of the second status control attribute is determined to be true, and not performing the operation of setting the attribute value of the second action status attribute to the second set value in the case that the attribute value of the second status control attribute is determined to be not true; and prior to performing the operation of changing the attribute value of the first action status attribute from the first set value to the second set value, the method further includes: determining whether the attribute value of the first status control attribute is true, performing the operation of changing the attribute value of the first action status attribute from the first set value to the second set value in the case that the attribute value of the first status control attribute is determined to be true, and not performing the operation of changing the attribute value of the first action status attribute from the first set value to the second set value in the case that the attribute value of the first status control attribute is determined to be not true.

Exemplarily, the method according to one embodiment of the present disclosure further includes setting the attribute value of the second action time attribute in response to triggering the second action.

Exemplarily, in the method according to one embodiment of the present disclosure, setting the attribute value of the first action time attribute includes: establishing an action execution timer to start timing in response to triggering the first action, and employing a time value of the action execution timer as the attribute value of the first action time attribute.

At least one embodiment of the present disclosure further provides an electronic device. The electronic device includes: a memory configured to non-transitorily store a computer-readable instruction; and a processor configured to execute the computer-readable instruction, wherein the processor, when executing the computer-readable instruction, is caused to perform the method as defined in any of the embodiments described above.

At least one embodiment of the present disclosure further provides an electronic device. The electronic device includes: a memory configured to non-transitorily store a computer-readable instruction; and a processor configured to execute the computer-readable instruction, wherein the processor, when executing the computer-readable instruction, is caused to perform the method as defined in any of the embodiments described above.

At least one embodiment of the present disclosure further provides a computer-readable storage medium configured to non-transitorily store a computer-readable instruction, wherein the computer-readable instruction, when executed by a computer, causes the computer to perform the method according to any of the embodiments described above or perform the method any of the embodiments described above.

BRIEF DESCRIPTION OF THE DRAWINGS

For clearer descriptions of the technical solutions in the embodiments of the present disclosure, the following briefly introduces the accompanying drawings of the embodiments. Apparently, the accompanying drawings in the following description show merely some embodiments of the present disclosure, which construe no limitation to the present disclosure.

FIG. 8B is a schematic diagram of a conflict policy sub-resource of a first action resource according to some embodiments of the present disclosure;

FIG. 9 is a schematic diagram of a method for executing an action according to some embodiments of the present disclosure;

DETAILED DESCRIPTION

Figure 1A:
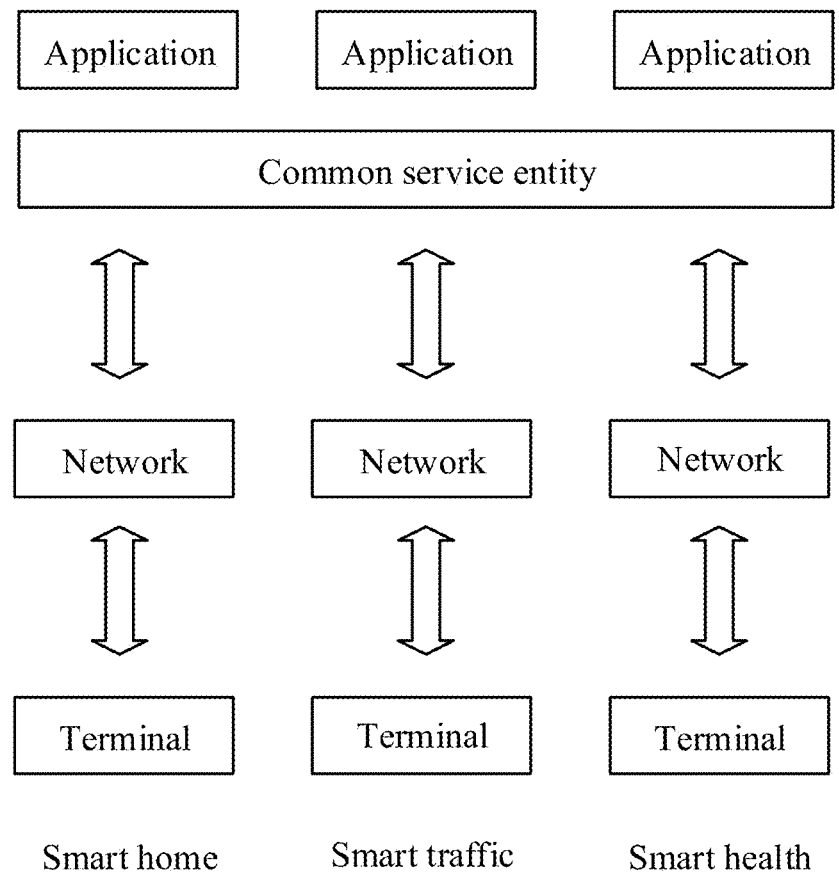
FIG. 1A is a schematic architectural diagram of the Internet of things according to the present disclosure.

For clearer descriptions of the objects, technical solutions, and advantages of the embodiments of present disclosure, the technical solutions of the embodiments of the present disclosure are described clearly and completely hereinafter in combination with the accompanying drawings in the embodiments of the present disclosure. It is obvious that the described embodiments are merely part but not all of the embodiments of the present disclosure. All other embodiments derived by those skilled in the art without creative efforts based on the embodiments in the present disclosure are within the protection scope of the disclosure.

Unless otherwise defined, technical terms or scientific terms used in the present disclosure shall have ordinary meaning understood by persons of ordinary skill in the art to which the present disclosure belongs. The terms "first," "second," and the like used in the present disclosure are not intended to indicate any order, quantity, or importance, but are merely used to distinguish different components. The terms "include," "comprise," and derivatives thereof are used to indicate that the elements or members preceding the term cover the elements, members or equivalents described following the term, and shall not be understood as excluding other elements or members. The terms "connection" and the like are not intended to be limited to physical or mechanical connection, but may include electrical connections, either direct or indirect connection. The terms "up," "down,"

"left," "right," and the like are merely used to denote relative positional relationships, and may also be changed accordingly when the absolute position of the member being described is changed.

For clear and concise illustration of the embodiments of the present disclosure, detailed descriptions for known functions and known components according to the present disclosure are omitted.

Internet of things may act as an extension of Internet, including the Internet and all resources on the Internet and compatible with all applications of the Internet. The Internet of things connects sensors, controllers, machines, persons, things, and the like together in a new fashion using a communication technology such as a localized network or the Internet, achieving connections between persons and things, and things and things.

With the development of the technology of Internet of things, more and more end devices (such as a carbon monoxide detector, a smoke alarm, a fire alarm, an air detector, and the like) access a platform of Internet of things. Exemplarily, the platform of Internet of things may be implemented as a common service entity (CSE), a terminal device may be connected to the common service entity in a fashion of transmitting registration information to the common service entity, and the common service entity manages the terminal device accessed the common service entity. The terminal device may be represented as an application entity (AE), and the application entity accessed the common service entity may perform operations such as data transmission and information interaction with the common service entity.

It should be noted that the application entity described herein may be an Internet of things terminal device, or may further be a software module in a device, or the like. The application entity and the common service entity are a logical entity, a physical device includes the logical entity, a simple terminal device may only include the application entity, a complex terminal device may include the application entity and the common service entity, and the server includes at least and the common service entity and may include the application entity. The difference between the common service entity included in the terminal device and the common service entity included in the server is the difference of functions, the common service entity of the server includes more functions, such as device management and the like.

FIG. 1A is a schematic architectural diagram of the Internet of things according to the present disclosure. As illustrated in FIG. 1A, the client devices of the various terminals access the network and further access a common service layer through the network, thereby forming an architecture of the terminal, network and application due to the common service layer supporting various applications. Exemplarily, in the field of the smart home, various home devices may access the common service layer through the local area network (LAN), such a local area network access may employ, for example, a wireless or wired fashion. Optionally, the local area network may be a personal area network (PAN), taking a wireless personal area network (WPAN) as an example, and the access may be realized through various technologies such as a Bluetooth, IrDA, Home RF, Zigbee, ultra-wideband (UWB) radio, or the like.

In the present disclosure, the described entities, such as the application entity AE, the common service entity CSE, data, and the like may all be represented by a resource. The resource may possess a unique identification including an attribute, and may further include, according to the case, a sub-resource. The attribute is configured to store information related to the resource, the sub-resource is a next level resource of the resource, and the resource includes an index to the sub-resource.

Exemplarily, based on different usage scenarios, a plurality of different action resources may be set for the same target resource (i.e., the target object) in different situations. The trigger conditions for an action resource set for the same target resource may be different, and the actions set for the target resource may be the same or different. The action resources illustrated in following FIG. 1C are only an illustrative example, and in fact, those skilled in the art may set any action triggering events based on an actual situation. In some embodiments, the action trigger event may be divided into a location event (setting a location generation event), a time event (setting a time generation event), an operation event (setting an operation generation event), and a user event (e.g., perceiving a presence of a user), and the like.

Exemplarily, in some embodiments, operations for a lamplet may include turning on and off. Exemplarily, the lamplet may be turned on in the case that a user is detected to get up at night or in sleep. The lamplet may be turned off in the case that a user is detected to in dream or in sleep. For another example, the window may be opened in response to a clear day, a gas leak, or smoke alarming. The window may be closed in response to detecting a cloudy day, a rainy day, or a snow day.

In some embodiments, the action resource may further be directed to a plurality of target resources. Exemplarily, the plurality of target resources (e.g., an air conditioner, an air purifier, a light, or the like) may be controlled to turn on in the case that a location sensor detects a presence of a person within a range.

In other embodiments, the action resource may further set a plurality of trigger conditions for an action of the target resource. Exemplarily, the air conditioner may be controlled to turn on in the case that a temperature sensor detects that a temperature is greater than or less than a preset temperature threshold, and a human sensor detects a person in the room.

In a complex use environment (e.g., a smart home scenario or the like), in order for a better usage experience of the user, a plurality of different action resources need to be set for each application device, such that each application device can perform appropriate functions in different use environments. In the smart home scenario, there may be a plurality of different action resources for the same target resource. Therefore, cases that instructions are simultaneously or sequentially for the same target resource and are conflicted may exist. Exemplarily, in a rainy day, the server controls the window to turn off, and where the smoke alarm detects that a smoke content in the air is greater than a standard content, the server controls the window to turn on. In this case, where the smoke content in the air is greater than the standard content, the server controls the window to turn on, and then where the rainy day is detected, the server controls the window to turn off.

It should be understood that where the smoke alarm detects that the smoke content in the air is greater than the standard content, an emergency situation, such as a fire, may occur in the room. In this case, where the window is controlled to be closed because the rainy day is detected by the server, the person in the room may be in danger. Furthermore, where the trigger conditions for two different actions of the same target resource are simultaneously satisfied, the server may be very difficult to efficiently control the target resource.

Figure 1B:
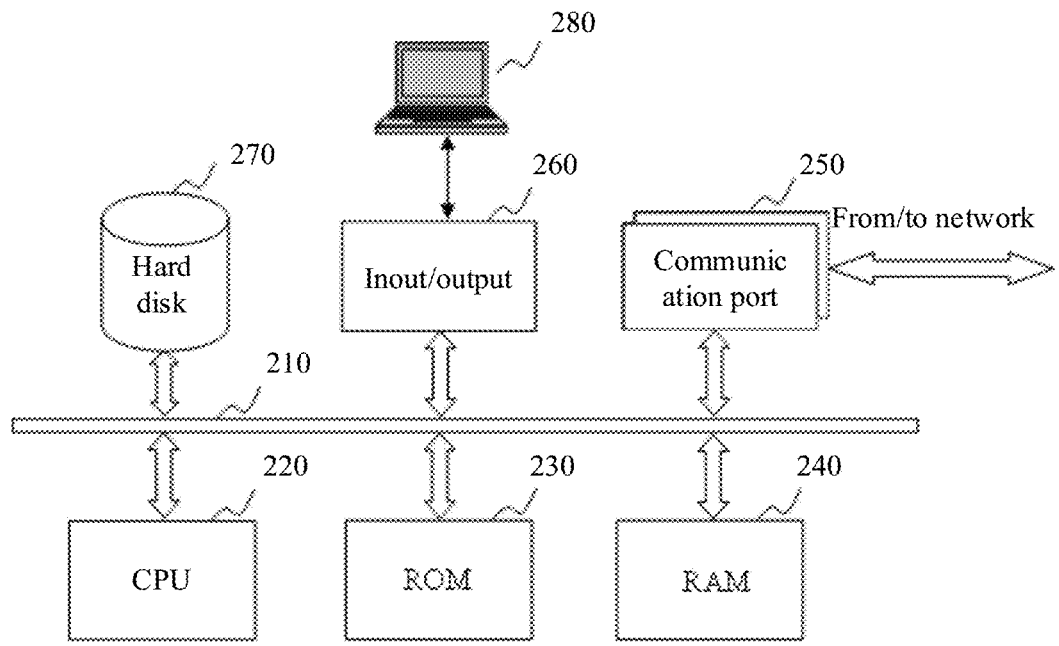
FIG. 1B is a schematic diagram of a server/client device according to an embodiment of the present disclosure.
Figure 1C:
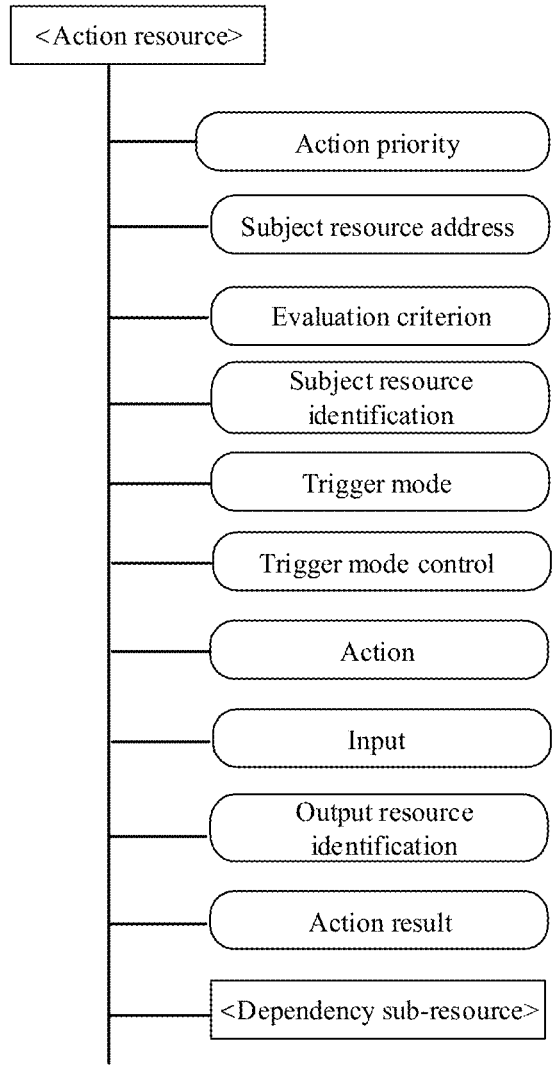
FIG. 1C is a schematic diagram of an example of an action resource according to some embodiments of the present disclosure.

FIG. 1B illustrates a schematic diagram of a server/client device according to an embodiment of the present disclosure. In an Internet of things system, the server may be utilized to implement the above service platform, and the client device may be utilized to implement the above terminal device.

The computer device illustrated in FIG. 1B may be configured to implement the server devices or client devices disclosed in the present disclosure. The computer may include a personal computer, a laptop computer, a tablet computer, a mobile phone, a personal digital assistant (PDA), a smart glass, a smart watch, a smart ring, a smart helmet, and any smart portable devices or wearable devices. In some embodiments, the architecture of the computer device illustrated in FIG. 1B may further implement terminal devices of different smart homes in the Internet of things system, such as a smart switch, a smart gateway, a smart rice cooker, a smart purifier, or the like. The specific system in the embodiment employs a functional block diagram to illustrate a hardware platform that includes a user interface. The computer device may be a computer device with general purposes, or a computer device with a specific purpose. Both computer devices may be used to implement a server device or the client device of the terminal in the embodiment. The computer system may implement any currently described assemblies that provide information required by the Internet of things communication. Exemplarily, a computer system can be implemented by a computer device via its hardware devices, software programs, firmware, and combinations thereof. For convenience, FIG. 1B only shows one computer device, but the relevant computer function of providing information required by the Internet of things communication described in the embodiment may be implemented in a distributed fashion by a set of similar platforms to disperse the processing load of the computer system.

As illustrated in FIG. 1B, the computer system may include a communications port 250, which is connected to a network for data communication. The computer system may further include a processor group 220 configured to execute program instructions. The processor group 220 may be composed of at least one processor (e.g., a CPU). The computer system may include an internal communication bus 210. The computer system may include various forms of program storage units and data storage units, such as a hard disk 270, a read-only memory (ROM) 230, a random-access memory (RAM) 240, which can be configured to store various data files processed by the computer and/or used for communication, and possible program instructions executed by the processor 220. The computer system may further include an input/output assembly 260 that supports input/output data flow between the computer system and other assemblies (such as the user interface 280). The computer system may further transmit and receive information and data by the communication port 250.

In some embodiments, the above computer system may be configured to compose the server in the Internet of things communication system. The server in the Internet of things communication system may be a server hardware device, or a group of servers. The servers in the group of servers may be connected by a wired or wireless network. The group of servers may be centralized, such as a data center. The group of servers may further be distributed, such as a distributed system.

The computer system as illustrated in FIG. 1B may implement a client application entity AE, a client common service entity CSE, a server terminal application entity AE, and/or a server terminal common service entity CSE involved in the present disclosure.

FIG. 1C illustrates a schematic diagram of an example of an action resource (<action>) according to some embodiments of the present disclosure.

Taking an oneM2M protocol architecture as an example, the entity may be all of entities in the M2M system, such as a machine to machine (M2M) device, an M2M gateway, an M2M application layer, or the like. With the M2M architecture, a resource is uniquely addressable, and an architecture of the resource may be specified to represent the resource. As illustrated in FIG. 1C, the action resources may include at least one attribute and/or a sub-resource. Exemplarily, the action resource <action> may include an action priority attribute (actionPriority) representing a priority of the action resource, a subject resource address attribute (actionSubjectResource) representing an object to be detected of the action resource, a subject resource identification attribute (SubjectResourceID) representing the object to be detected of the action resource, an evaluation criterion attribute (evalCriteria) representing an action trigger condition of the action resource, a trigger mode attribute (evalMode) representing a trigger mode of the action resource, a trigger mode control attribute (evalControlParam) representing a trigger mode of the action resource, an object identification attribute (objectResourceID) representing a control object of the action resource, an action attribute (activePrimitive) representing an action pattern of the action resource, an input attribute (input) representing an action parameter of the action resource, an output resource identification attribute (outputResourceID) representing an action result of the action resource, an action result attribute representing the action result of the action resource, and a dependency sub-resource (actionResult) representing a dependency condition of an action performed by the action resource (<dependency>). Exemplarily, the action resource may further include a plurality of dependency sub-resources.

It is noted that the action priority indicates priorities among a plurality of action resources triggered by the same trigger condition. Exemplarily, in the case that a concentration of carbon monoxide in the air is greater than a preset threshold, both the window and the door may be controlled to open. The action priority indicates the priority between the action resource controlling the window opening and the action resource corresponding to the control door opening, i.e., the sequential order. Exemplarily, in the case that the action priority of the action resource with the window as the target resource takes precedence over the action priority of the action resource with the door as the target resource, the window is first controlled to open and then the door is controlled to open where the concentration of carbon monoxide in the air is greater than the preset threshold.

Exemplarily, a subject resource attribute of the action resource may be updated in a predefined fashion. Exemplarily, an application entity registered on the server may transmit information to the server periodically, in real-time, or in response to the occurrence of a preset event fashion, to update the subject resource attributes. In the case that the information received from the application entity causes the evaluation criterion of the action resource to satisfy the action trigger condition of the action resource, a preset action may be performed for the target resource corresponding to the target identification attribute of the action resource. Herein, the subject resource attribute may also be referred to as a subject resource.

In some embodiments, the evaluation criterion attribute may include at least one trigger condition, and the dependency sub-resource may include at least one dependency condition. The action resource illustrated in FIG. 1C is configured to perform the preset action, i.e., an action defined in the action attribute, for the target resource corresponding to the target identification attribute in the case that the trigger condition included in the evaluation criterion attribute is satisfied and the dependency condition included in the dependency sub-resource is satisfied.

Although an illustrative example of implementing action resources is illustrated in the present disclosure, it is understood for those skilled in the art that the above action resources may further be set in other ways depending on the actual circumstances.

Figure 2:
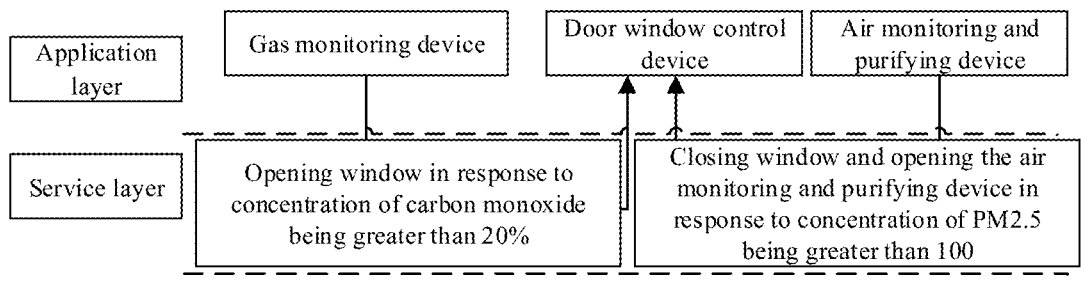
FIG. 2 is a schematic diagram of a smart home scenario in the Internet of things environment according to some embodiments of the present disclosure.

FIG. 2 is a schematic diagram of a smart home scenario in the Internet of things environment according to some embodiments of the present disclosure Exemplarily, a smart home scenario is taken as an example, and three application entities, a door window control device, a gas monitoring device (e.g., provided by a smart security provider), and an air monitoring and purifying device (e.g., provided by a smart appliance provider), are configured in the smart home scenario. It should be understood that in the case that a plurality of smart control devices are configured in the smart home Internet of things environment, the application entity may deploy a plurality of services to the same target resource (i.e., the target object). That is, a plurality of action resources are created for the same target resource, and a plurality of actions of the plurality of action resources performed for the target resource and the trigger conditions for the plurality of actions may be different.

As illustrated in FIG. 2, the application entity is disposed at an application layer, and the common service entity is disposed at a service layer (i.e., an Internet of things platform). The gas monitoring device and the air monitoring and purifying device both act on the door window control device through the action provided by the service layer.

The gas monitoring device may register action resource 1 on the common service entity, and the action resource 1 indicates that the gas monitoring device detects the concentration of the carbon monoxide in the air by a carbon monoxide sensor, and in the case that the concentration of the carbon monoxide is greater than a preset threshold (e.g., 20%), the common service entity may trigger the door window control device to open the window (or door) to vent, so as to reduce the concentration of the combustible gas (e.g., carbon monoxide).

The air monitoring and purifying device may register action resource 2 on the common service entity, and the action resource 2 indicates that the air monitoring and purifying device detects the concentration of PM2.5 (haze) in the air by an air quality monitor sensor (e.g., a haze sensor), and in the case that the concentration of PM2.5 is greater than a preset threshold, the common service entity may trigger the door window control device to close the window (or door) and then turn on the air monitoring and purifying device, so as to achieve a reduction in the concentration of PM2.5 in the air.

The two action resources described above both refer to controlling the same execution unit (i.e., the door window control device). The action resource 1 controls the door window control device to perform a windowing operation, and the action resource 2 controls the door window control device to perform a closing window operation, such that the action resource 1 and the action resource 2 may conflict. The conflict may include that, at first, the two action resources need to be triggered at the same moment, and the two operations controlling the door window control device to perform are opposite; at second, the other action resource is triggered upon one action resource, but the effect that the other action resource actually created and the effect that the one action resource needs to reach are opposite.

The embodiments of the present disclosure provide a method for creating an action resource, a method for executing an action, an electronic device, and a computer-readable storage medium. In the method for creating the action resource, the conflict problem of the action resources may be solved, based on the dependency condition related to the action status attribute, by increasing the action status attribute in the action resource. It should be noted that in the embodiments of the present disclosure, both the method for creating the creation resource and the method for executing the action are performed, for example, by the common service entity.

The flowchart is used in the present disclosure to illustrate the processes of the method according to an embodiment of the present disclosure. It should be understood that the foregoing or following processes are not necessarily to be performed in the sequential order. Various processes may be performed in reverse order or simultaneously. Other operations may further be added to, or removed from, the processes.

Figure 3A:
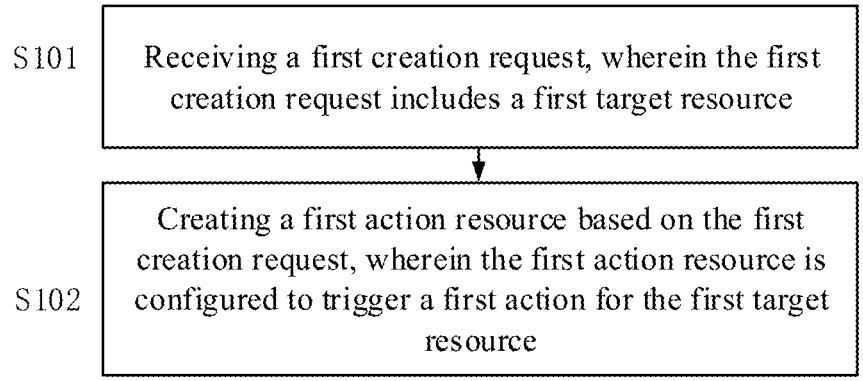
FIG. 3A is a flowchart showing a method for creating an action resource according to some embodiments of the present disclosure.
Figure 3B:
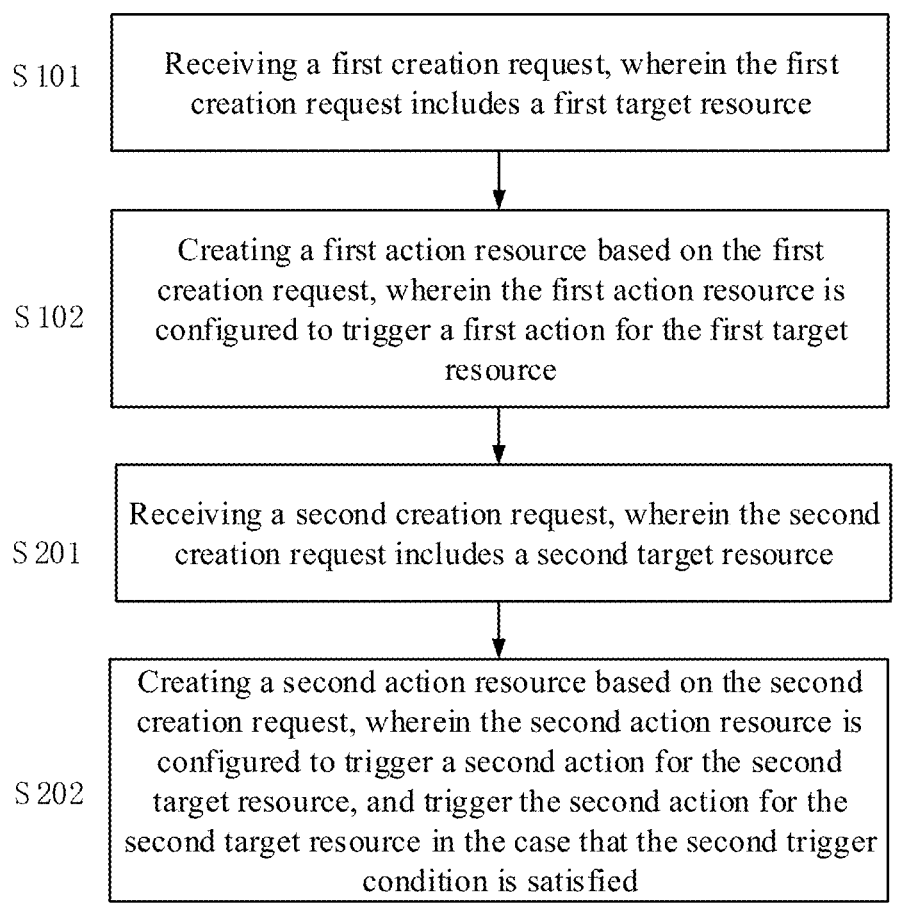
FIG. 3B is a flowchart showing another method for creating an action resource according to some embodiments of the present disclosure.

FIG. 3A illustrates a flowchart of a method for creating an action resource according to some embodiments of the present disclosure, and FIG. 3B illustrates a flowchart of another method for creating an action resource according to some embodiments of the present disclosure. Exemplarily, in a smart home use environment, the common service entity may be implemented as a home management server, and the application entity (an application) may be implemented as a home management application (e.g., the carbon monoxide sensor, the temperature sensor, the door window sensor, or the like).

Exemplarily, as illustrated in FIG. 3A, in some embodiments, the method for creating the creation resource may include the following processes.

In S101, a first creation request is received, and the first creation request includes a first target resource.

In S102, a first action resource is created based on the first creation request, and the first action resource is configured to trigger the first action for the first target resource.

Exemplarily, the first creation request is configured to request the common service entity to create the first action resource.

Exemplarily, the first target resource may be a window, a door, an air purifier, a lamp, an air conditioner, or the like.

It should be noted that in some embodiments of the present disclosure, an operation performed on the window is taken as an example, i.e., the first target resource is the window. The common service entity may transmit a notification to a window controller to control the open and close of the window.

Exemplarily, the first action may include any operation, such as a turning on operation, a turning off operation, a brightening operation, a dimming operation, an increasing temperature operation, a reducing temperature operation, or the like. It should be noted that, in the present disclosure, where the first target resource is the air conditioner, the first action may include the operation of turning on the air conditioner and the operation of setting the air conditioner to the cooling mode in response to performing the action of turning on the cooling mode of air conditioner. That is, in the present disclosure, the action corresponding to the action resource may include a plurality of operations for the target resource to eventually achieve a preset effect. Exemplarily, in the above examples, the first action may include two operations, that is, the operation to turning on the air conditioner and the operation of setting the air conditioner to the cooling mode, thereby achieving the effect of turning on the cooling mode of air conditioner.

Exemplarily, in the case that the first trigger condition is satisfied, the first action is triggered for the first target resource, and the first trigger condition may be set according to an actual situation. Exemplarily, in some examples, the first trigger condition may be that the concentration of carbon monoxide is greater than the preset threshold, the concentration of PM 2.5 is greater than the preset threshold, the indoor light brightness is greater than or less than a preset threshold, the user is detected within a range (e.g., within a bedroom, a living room, or the like), the temperature is greater than/less than a preset temperature threshold, or the like.

Exemplarily, the first creation request may be transmitted by the application entity (e.g., the air monitoring and purifying device) to the common service entity, or created by the user on the common service entity for the application entity.

Exemplarily, in the case that the application entity intends to deploy one action on the service platform, the application entity may transmit the creation request for the action resource of the action to the service platform, such that the common service entity deployed on the service platform may create the action resource. Exemplarily, in some examples, the first action resource is a resource for triggering and opening window (i.e., the first action) for the window (i.e., the first target resource). Exemplarily, in the case that the first action resource indicates a resource that the turning off operation is performed for the window when the concentration of PM 2.5 in the air is detected to be greater than a preset threshold A (e.g., 100, 150, or the like), the first trigger condition is that the concentration of PM 2.5 is greater than the preset threshold A, the first target resource is the window, and the first action is closing the window. The preset threshold A may be set according to the actual application requirements. Exemplarily, the application entity may transmit the first creation request to the common service entity (e.g., a home management server), and deploy the first action resource on the common service entity in response to the common service entity passing the identity check of the application entity. That is, the turning off operation for the window is performed in the case that the concentration of PM 2.5 in the air is detected to be greater than the preset threshold A. Exemplarily, the concentration of PM 2.5 in the air may be detected by the air quality monitor sensor registered to the service platform, and the turning off operation for the window may be performed by the window controller registered to the service platform.

Exemplarily, in S102, creating the first action resource may include creating a first action status attribute for the first action resource.

Figure 4A:
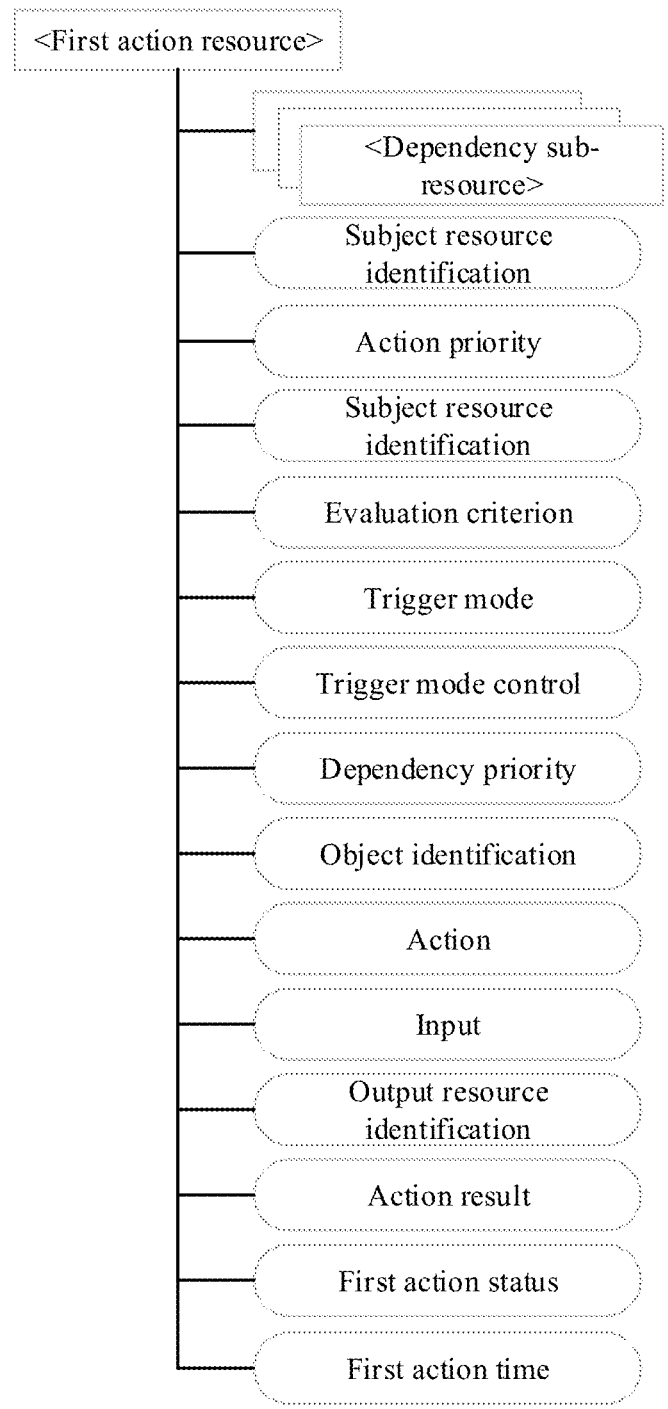
FIG. 4A is a schematic diagram of a first action resource according to some embodiments of the present disclosure.

FIG. 4A illustrates a schematic diagram of a first action resource according to some embodiments of the present disclosure.

Exemplarily, as illustrated in FIG. 4A, the first action resource (<action1>) may include a first action status attribute. The first action status attribute indicates a status of the first action. The first action status attribute is a status value.

Exemplarily, in S102, an attribute value of the first action status attribute includes a first set value and a second set value, and the status of the first action is active or inactive. Exemplarily, in the case that the attribute value of the first action status attribute is the first set value, the status of the first action is active. That is, the first set value is active, indicating that the first action is triggered to execute. In the case that the attribute value of the first action status attribute is the second set value, the status of the first action is inactive. That is, the second set value is inactive, indicating that the first action is not triggered to execute. Exemplarily, in the case that the first action resource is created, but is not triggered to execute, the attribute value of the first action status attribute is the second set value. That is, the status of the first action is inactive; and in the case that the first action resource is created and is triggered, the attribute value of the first action status attribute is the first set value. That is, the status of the first action is active.

Exemplarily, where the first action resource is configured to trigger the opening window operation (i.e., the first action) for the window (i.e., the first target resource), in the case that the first action resource is created, but does not transmit a notification to the window controller to control the window to open, the attribute value of the first action status attribute is the second set value. In the case that the notification is transmitted to the window controller to control the window to open, the attribute value of the first action status attribute is changed from the second set value to the first set value.

Although in this embodiment of the present disclosure, a case where the first set value indicates the status of the first action is active, and the second set value indicates the status of the first action is inactive is taken as an example, the present disclosure is not limited thereto. In some embodiments, the first set value may further represent that the status of the first action is inactive, and accordingly, the second setting value indicates that the status of the first action is active. It should be noted that, the attribute value of the first action status attribute is the first set value or the second set value in any case. That is, the attribute value of the first action status attribute cannot be both the first set value and the second set value.

It should be noted that, in some embodiments, the first action resource is further configured to trigger a predefined action (e.g., closing the door) based on the first trigger condition (e.g., the concentration of PM2.5 is greater than the preset threshold A) for the target resource (e.g., the door) that is different from the first target resource (e.g., the window). In an example, the predefined action and the first action may be the same, and may trigger the closing operation for the window based on the first trigger condition, and trigger the closing operation for the door based on the first trigger condition. In other examples, the predefined action and the first action may be different. Exemplarily, the closing operation may be triggered for the window based on the first trigger condition, and the opening operation may be triggered for the air purifier based on the first trigger condition. That is, the first action resource may include a plurality of target resources, and may perform the predefined action on one or more of the plurality of target resources in response to the trigger condition. The plurality of target resources are different, and the predefined actions corresponding to the plurality of target resources may be different, or the predefined actions corresponding to at least part of the target resource may be the same.

Exemplarily, in S102, creating the first action resource further includes: creating a first action time attribute for the first action resource. Exemplarily, the first action time attribute indicates a time parameter related to the first action.

Exemplarily, as illustrated in FIG. 4A, the first action resource further includes a first action time attribute. The first action time attribute is a status value, and the first action time attribute indicates the time in response to triggering the first action to execute. Exemplarily, in response to establishing the first action resource, the first action is not triggered to execute. Therefore, the attribute value of the first action time attribute is not set, or is empty or absent, and the attribute value of the first action time attribute does not possesses the corresponding meaning. In the case that the first action resource is established, and the first action is triggered to execute, the corresponding timer may be established, and the timer value (time value) of the timer may act as the attribute value of the first action time attribute. It should be noted that the time value of the timer may include various values representing time, such as a duration of the timer recorded, a start time and/or an end time of the timer ticked.

Exemplarily, the time parameter may include at least one of a duration in response to triggering the first action, the start time of performing the first action, and the end time of performing the first action. It should be noted that, in some embodiments, the time parameter is not necessarily a direct time, but may be an indirect time, such as a number of executions, or the like.

Exemplarily, in some embodiments, as illustrated in FIG. 3B, the creation method may further include the following processes:

In S201, a second creation request is received, wherein the second creation request includes a second target resource.

In S202, a second action resource is created based on the second creation request, wherein the second action resource is configured to trigger a second action for the second target resource, and trigger the second action for the second target resource in the case that the second trigger condition is satisfied.

Exemplarily, the second creation request is configured to request the common service entity to create the second action resource.

Exemplarily, the first target resource and the second target resource are the same target resource, e.g., in an example, both the first target resource and the second target resource are the window (a window or all windows in the room). The present disclosure is not limited, and in other examples, the first target resource and the second target resource may further be different target resources. Exemplarily, the first target resource is a window of a living room, and the second target resource is a window of a bedroom; or, the first target resource is a window (a window or all windows in the room), and the second target resource is a door (a door or all doors in the room).

Exemplarily, the second target resource may be the window, the door, the air purifier, the light, the air conditioner, or the like.

Exemplarily, the second action may include an opening operation, a closing operation, a brightening operation, a dimming light operation, a dimming temperature operation, a turn off temperature operation, or the like.

Exemplarily, the second action and the first action are different, that is, the second action may be any other action than the first action. Exemplarily, in some examples, the first action and the second action conflict with each other, e.g., the first action may indicate setting the air conditioner to 25° C., and the second action may indicate setting the air conditioner to 18° C. Exemplarily, in an example, the first action and the second action are opposite to each other, e.g., in the case that the first action includes performing a turning on operation on the first target resource (e.g., turning on the window, turning on the purifier), the second action may include performing the turning off operation on the second target resource (e.g., turning off the window, turning off the purifier). Exemplarily, in some examples, the first action may be turning on the window, and the second action may be turning off the window.

Exemplarily, the second trigger condition may be set according to actual conditions. Exemplarily, in some examples, the second trigger condition may be that the concentration of carbon monoxide is greater than the preset threshold, the concentration of PM2.5 is greater than the preset threshold, an indoor light brightness is greater than or less than a preset threshold, the user is detected within the range (e.g., within the bedroom, within the living room, or the like), and the temperature is greater/less than the preset temperature threshold, or the like.

Exemplarily, in some examples, the second trigger condition may be different from the first trigger condition. Exemplarily, in the case that the first action resource is configured to close the window in response to the haze parameter (i.e., the concentration of PM2.5) being greater than the preset threshold A, and the second action resource is configured to open the window in response to the concentration of carbon monoxide in the air being greater than the preset threshold B, the first trigger condition may be that the haze parameter is greater than the preset threshold A, and the second trigger condition may be that the concentration of carbon monoxide is greater than the preset threshold B.

Exemplarily, the second creation request may further be transmitted by the application entity (e.g., the gas monitoring device) to the common service entity, or created by the user on the common service entity for the application entity.

Exemplarily, the application entity may transmit the second creation request to the common service entity, and the second action resource is deployed on the common service entity in response to the common service entity is identified by the application entity. The opening operation is performed on the window in response to the concentration of carbon monoxide in the air being greater than the preset threshold B.

Exemplarily, in S202, creating the second action resource may include creating a second action status attribute for the second action resource.

Figure 4B:
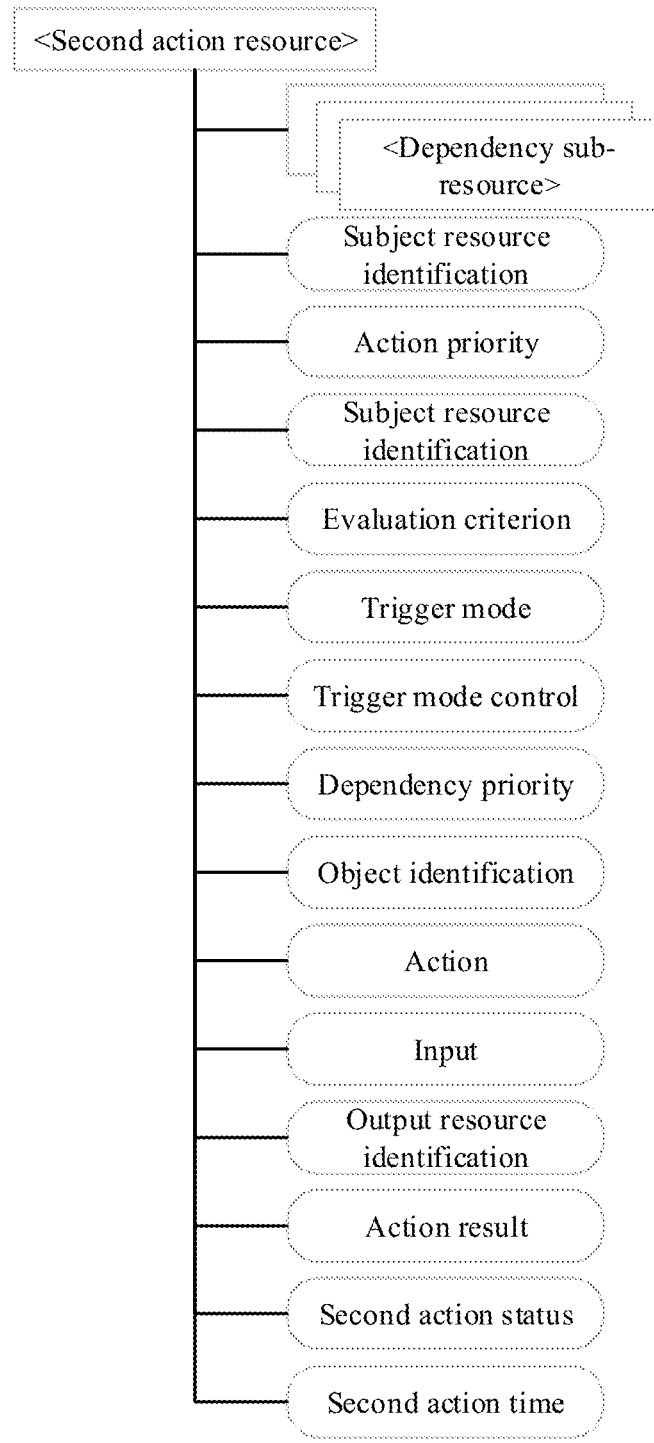
FIG. 4B is a schematic diagram of a second action resource according to some embodiments of the present disclosure.

FIG. 4B illustrates a schematic diagram of a second action resource according to some embodiments of the present disclosure.

Exemplarily, as illustrated in FIG. 4B, the second action resource (<action2>) may include a second action status attribute (actionStatus). The second action status attribute indicates a status of the second action, and the second action status attribute is a status value.

Exemplarily, the attribute value of the second action status attribute further includes the first set value and the second set value. That is, the status of the second action includes active or inactive. Exemplarily, in the case that the attribute value of the second action status attribute is the first set value, the status of the second action is active, indicating that the second action is triggered to execute; in the case that the attribute value of the second action status attribute is the second set value, the status of the second action is inactive, indicating that the second action is not triggered to execute. For details about the second action status attribute, reference may be made to the description of the first action status attribute described above, which is not repeated herein.

Exemplarily, in some examples, the second action resource may be configured to trigger the opening window operation (i.e., the second action) for the window (i.e., the second target resource). Exemplarily, the second action resource may represent a resource that the opening operation is performed on the window in the case that the concentration of carbon monoxide in the air is detected to be greater than the preset threshold B (e.g., 20%). The second trigger condition is that the concentration of carbon monoxide is greater than the preset threshold B, the second target resource is the window, and the second action is to open the window. Exemplarily, the concentration of carbon monoxide in the air may be detected by a carbon monoxide sensor registered on the service platform, and the preset threshold B may be set according to the actual application requirements.

Exemplarily, creating the second action resource further includes creating a second action time attribute for the second action resource. Exemplarily, the second action time attribute indicates a time parameter related to the second action. Exemplarily, the time parameter related to the second action includes at least one of a duration upon execution of the second action, a start time to perform the second action, or an end time to perform the second action.

Exemplarily, as illustrated in FIG. 4B, the second action resource further includes the second action time attribute (actionActiveTime). The second action time attribute is a status value, and the second action time attribute indicates a duration upon triggering of the second action. It should be noted that for details about the second action status attribute, reference may be made to the description of the first action time attribute described above, which is not repeated herein. In the following embodiments of the present disclosure, unless explicitly stated, the embodiment of the present disclosure is described by taking the first action time attribute indicating the duration upon execution of the first action, and the second action time attribute indicating the duration upon execution of the second action as an example.

It should be noted that, as illustrated in FIG. 4A and FIG. 4B, both the first action resource and the second action resource may further include a dependency priority attribute (evalPriority) indicating a priority of the dependency condition of the action resource, an action priority attribute (actionPriority), a subject resource attribute (actionSubjectResource), a subject resource ID (SubjectResourceID), an evaluation criterion attribute (evalCriteria), a trigger mode attribute (evalMode), a trigger mode control attribute (evalControlParam), an object identification attribute (objectResourceID), an action attribute of the action pattern (activePrimitive), an input attribute (input) of the action parameter, an output resource identification attribute (outputResourceID) of the action result, an action result attribute (actionResult), and a dependency sub-resource (<dependency>) of the dependency condition. Exemplarily, the action result is a status value. It should be noted that the dependency priority attribute of the first action resource indicates a determination order of a plurality of dependency conditions in the case that the first action resource possesses the plurality of dependency conditions; and the dependency priority attribute of the second action resource indicates a determination order of a plurality of dependency conditions in the case that the second action resource possesses the plurality of dependency conditions.

It should be noted that in the present disclosure, the plurality of attribute values of the first action resource or the second action resource may be created based on the same creation request, or may be created based on the plurality of creation requests. Exemplarily, in some examples, other attributes of the first action resource than the dependency sub-resource (e.g., the first dependency sub-resource and/or the second dependency sub-resource) may be created based on the first creation request, and the dependency sub-resource of the first action resource may be created based on the third create request transmitted to the common service entity; or the first action status attribute and the first action time attribute of the first action resource may be created based on the first creation request, and other attributes of the first action resource than the first action status attribute and the first action time attribute may be created based on the third create request transmitted to the common service entity. The specific creation times and procedures of various attributes of the first action resource and second action resource are not particularly limited in the present disclosure.

Exemplarily, in some embodiments, the first creation request further includes the dependency resource information.

Exemplarily, in some examples, creating the first action resource further includes creating a first dependency sub-resource for the first action resource based on the dependency resource information. Exemplarily, the first dependency resource includes a first dependency condition, and the first dependency condition is associated with the second action status attribute. Exemplarily, the first action is triggered for the first target resource in the case that the first trigger condition and the first dependency condition are simultaneously satisfied.

Exemplarily, in the case that the first action resource includes the first dependency sub-resource, and the first trigger condition is satisfied, the common service entity may determine whether the second action status attribute satisfies the first dependency condition in the first dependency sub-resource, and the first action is triggered for the first target resource in response to the second action status attribute satisfying the first dependency condition; and the first action is triggered in response to the second action status attribute not satisfying the first dependency condition.

Exemplarily, in other examples, creating the first action resource further includes creating the second dependency sub-resource for the first action resource based on the dependency resource information. Exemplarily, the second dependency sub-resource includes a second dependency condition, and the second dependency condition is associated with the second action time attribute. Exemplarily, the first action is triggered for the first target resource in the case that the first trigger condition and the second dependency condition are simultaneously satisfied.

Exemplarily, in the case that the first action resource includes the second dependency sub-resource, and the first trigger condition is satisfied, the common service entity may determine whether the second action status attribute satisfies the second dependency condition in the second dependency sub-resource, and the first action is triggered for the first target resource in response to the second action status attribute satisfying the second dependency condition; and the first action is not triggered in response to the second action status attribute not satisfying the second dependency condition.

Exemplarily, in other examples, creating the first action resource further includes creating the first dependency sub-resource and the second dependency sub-resource for the first action resource based on the dependency resource information. Exemplarily, the first dependency resource includes the first dependency condition, and the first dependency condition is associated with the second action status attribute. The second dependency sub-resource includes the second dependency condition, and the second dependency condition is associated with the second action time attribute. Exemplarily, the first action is triggered for the first target resource in the case that at least one of the first dependency condition or the second dependency condition, and the first trigger condition are simultaneously satisfied.

Exemplarily, where the first action resource includes a plurality of dependency sub-resources, the relationship among the plurality of dependency sub-resources may be a necessary relationship or a sufficient relationship. Where the relationship among the plurality of dependency sub-resources may be the sufficient relationship, the first action may be triggered for the first target resource in the case that any one of the plurality of dependency sub-resources are satisfied; where the relationship between the plurality of dependency sub-resources may be the necessary relationship, the first action may be triggered for the first target resource in the case that a plurality of dependency sub-resources are satisfied. Exemplarily, in an embodiment, where the first action resource includes the first dependency sub-resource and the second dependency sub-resource, and the first dependency sub-resource and the second dependency sub-resource are the sufficient relationship, the first dependency sub-resource is identified in the case that the first trigger condition is satisfied. In the case that the first dependency sub-resource is verified, the second dependency sub-resource does not need to be identified, and the first action may be triggered for the first target resource. Where the first dependency sub-resource is not verified, the second dependency sub-resource is identified, the first action may be triggered for the first target resource in the case that the second dependency sub-resource is verified, and the first action may not be triggered for the first target resource in the case that the second dependency sub-resource is not verified. Where the first dependency sub-resource and the second dependency sub-resource are the necessary relationship, the first dependency sub-resource is identified in the case that the first trigger condition is satisfied. In the case that the first dependency sub-resource is verified, the second dependency sub-resource is identified, and the first action may be triggered for the first target resource where the second dependency sub-resource is verified. The first action cannot be triggered for the first target resource where any of the first dependency sub-resource and the second dependency sub-resource is not verified.

Exemplarily, where the first action resource includes the first dependency sub-resource and the second dependency sub-resource, and the first dependency sub-resource and the second dependency sub-resource are the sufficient relationship. In the case that the first trigger condition is satisfied, the common service entity may first determine whether the second action status attribute satisfies the first dependency condition in the first dependency sub-resource, and the first action is triggered for the first target resource in response to the second action status attribute satisfying the first dependency condition; and whether the second action time attribute satisfies the second dependency condition in the second dependency sub-resource is determined in the case that the second action status attribute does not satisfy the first dependency condition. The first action is triggered for the first target resource in the case that the second action time attribute satisfies the second dependency condition, and the first action is not triggered in the case that the second action status attribute does not satisfy the first dependency condition, and the second action time attribute does not satisfy the second dependency condition.

Exemplarily, the common service entity may create the first dependency sub-resource and/or the second dependency sub-resource for the first action resource based on the dependency resource information, and the number of the dependency sub-resources of the first action resource may be set based on the actual application requirements, which is not limited in the present disclosure.

Exemplarily, the first dependency condition is the attribute value of the second action status attribute and the first set value satisfying a first preset logical relationship, and the first set value is active or inactive. The second dependency condition is the attribute value of the second action time attribute and the preset action time satisfying a second preset logical relationship.

Exemplarily, in some examples, for the status, the first preset logical relationship may be equal to or not equal to. That is, the first preset logical relationship may indicate that the attribute value of the second action status attribute is equal to the first set value, or the attribute value of the second action status attribute is not equal to the first set value. Where the first set value is active, the first preset logical relationship may indicate that the attribute value of the second action status attribute is active, or the attribute value of the second action status attribute is not active; where the first set value is inactive, the first preset logical relationship may indicate that the attribute value of the second action status attribute is inactive, or the attribute value of the second action status attribute is not inactive.

Exemplarily, in some examples, for the time, the second preset logical relationship may be "equal to, not equal to, greater than, less than, greater than or equal to, less than or equal to, longer than, shorter than, longer than or equal to, shorter than or equal to, or the like." Exemplarily, in some examples, where the second action time attribute indicates a duration in response to triggering the second action, the preset action time indicates that the second action resource has an exclusive time range for the second target resource in response to performing the second action. In this case, the second preset logical relationship may indicate that the attribute value of the second action time attribute is greater than, greater than or equal to, longer than, or longer than or equal to the preset action time. Exemplarily, in other examples, where the second action time attribute indicates that the remaining time that the second action resource has an exclusive for the second target resource in response to performing the second action. The preset action time may be 0, and in this case, the second preset logical relationship may indicate that the attribute value of the second action time attribute is equal to the preset action time.

Exemplarily, the preset action time may be preset according to the actual application requirements. Exemplarily, the preset action time may be 0, 5 minutes, 72 hours, or the like.

Exemplarily, each dependency sub-resource of the first action resource may include at least one dependency condition. Exemplarily, in some embodiments, the first action resource may include one dependency sub-resource including two dependency conditions, and the two dependency conditions are that the attribute value of the second action status attribute is not equal to the first preset value, and the attribute value of the second action time attribute is greater than the preset action time.

Exemplarily, in some embodiments, the first action resource is configured to trigger the closing window operation (i.e., the first action) for the window (i.e., the first target resource). Exemplarily, the closing operation is performed for the window in the case that the concentration of PM2.5 in air is detected to be greater than the preset threshold A (e.g., 150). The second action resource is configured to trigger the opening window operation (i.e., the second action) for the window (i.e., the second target resource). Exemplarily, the opening operation is performed for the window in the case that the concentration of carbon monoxide in the air is detected to be greater than the preset threshold B (e.g., 20%). Table 1 shows the various attribute values of the second action resource of an example of this embodiment, and Table 2 shows various attribute values of the first action resource of an example of this embodiment.

TABLE 1

| | | Action2 | | |
|---|---|---|---|---|
| Attribute value 1 | actionSubjectResource | address of <container1(carbon monoxide sensor date container resource)> | | |
| Attribute value 2 | SubjectResourceID | identification code (ID) of <container1(carbon monoxide sensor date container resource)> | | |
| Attribute value 3 | evalCriteria | subject | 'Container1.content' | concentration of carbon monoxide greater than 50 ppm |
| | | operator | 'greater than' | |
| | | threshold | '50 ppm' | |
| Attribute value 4 | evalMode | 'periodic' | | |
| Attribute value 5 | evalControlParam | '5 s' (monitor period) | | |
| Attribute value 6 | objectResourceID | ID of <container2>(object resource: switch of window) | | |
| Attribute value 7 | actionPrimitive | to | resource address corresponding to switch resource of window (objectResourceID) | resource address |
| | | resource type | resource type corresponding to switch resource of window (objectResourceID) | resource type |
| | | content | packed date of input content | packed date of open instruction (string) content of indicating an update operation |
| | | op | update | |
| | | the like | | |
| Attribute value 8 | input | open instruction (string) | | |
| Attribute value 9 | outputResourceID | ID of <container3 (window controller container resource)> | | |
| Attribute value 10 | actionResult | status value (action result) | | |
| Attribute value 11 | actionStatus | status value (whether the action is triggered) | | |
| Attribute value 12 | actionActiveTime | status value (time where the action is in a triggered state) | | |

Exemplarily, Table 1 shows 12 attribute values for the second action resource. In Table 1, the data packed in content in the attribute value 8 and the attribute value 7 are the same. Exemplarily, the attribute value 8 may further be represented as the identification code of the resource (the resourceID), a universal resource identifier (URI) of a resource attribute, or the like.

TABLE 2

| | | Action1 | | |
|---|---|---|---|---|
| First dependency sub-resource 1 | <dependency 1> | | | |
| First dependency sub-resource 2 | <dependency 2> | | | |
| Attribute value 1 | actionSubjectResource | address of <container4 (air quality sensor date container resource) > | | |
| Attribute value 2 | SubjectResourceID | identification code (ID) of <container4 (air quality sensor date container resource) > | | |
| Attribute value 3 | evalCriteria | subject | 'Container4.content' | concentration of PM2.5 greater than 150 |
| | | operator | 'greater than' | |
| | | threshold | '150' | |
| Attribute value 4 | evalMode | 'periodic' | | |
| Attribute value 5 | evalControlParam | '5 s' (monitor period) | | |
| Attribute value 6 | objectResourceID | ID of <container2>(object resource: switch of window) | | |

TABLE 2-continued

| | | | Action1 | |
|---|---|---|---|---|
| Attribute value 7 | actionPrimitive | to | resource address corresponding to switch resource of window (objectResourceID) | resource address |
| | | resource type | resource type corresponding to switch resource of window (objectResourceID) | resource type |
| | | content | packed date of input content of | packed date of open instruction (string) content of |
| | | op | update | indicating an update operation |
| | | the like | | |
| Attribute value 8 | input | close instruction (string) | | |
| Attribute value 9 | outputResourceID | ID of<container3 (window controller container resource)> | | |
| Attribute value 10 | actionResult | status value (action result) | | |
| Attribute value 11 | actionStatus | status value (whether the action is triggered) | | |
| Attribute value 12 | actionActiveTime | status value (time where the action is in a triggered state) | | |

Exemplarily, Table 2 shows 12 attribute values for the first action resource, the first dependency sub-resource 1, and the second dependency sub-resource 2. In Table 2, the data packed in content in the attribute value 8 and the attribute value 7 are the same. Exemplarily, the attribute value 8 may further be represented as the identification code of the resource (the resourceID), a universal resource identifier (URI) of a resource attribute, or the like.

Table 3 shows the first dependency sub-resource 1 for the first action resource; Table 4 shows the second dependency sub-resource 2 for the first action resource.

TABLE 3

| Attribute value 1 | logic | SUFFICIENT(relationship between <dependency>) | | |
|---|---|---|---|---|
| Attribute value 2 | dependencyResourceID | ID of<action2>(<action2>resource) | | |
| Attribute value 3 | evalCriteria | subject | 'Action2.status' | corresponding actionStatus of <action2> |
| | | operator | 'not equal to' | not equal to |
| | | threshold | 'active' | active |

TABLE 4

| Attribute value 1 | logic | SUFFICIENT(relationship between <dependency>) | | |
|---|---|---|---|---|
| Attribute value 2 | dependencyResourceID | ID of<action2>(<action2> resource) | | |
| Attribute value 3 | evalCriteria | subject | 'Action2.activeTime | corresponding actionActiveTime of <action2> |
| | | operator | 'greater than' | greater than |
| | | threshold | '72 h' | 72 hours |

It can be seen that from Tables 3 and 4, the first dependency sub-resource 1 includes three attribute values. The second dependency sub-resource 2 also includes three attribute values. The three attribute values in the first dependency sub-resource 1 or the second dependency sub-resource 2 are logic attribute, dependency ResourceID, and evalCriteria.

The logic attribute value in the first dependency sub-resource 1 or the second dependency sub-resource 2 indicates a mutual relationship between a plurality of dependency sub-resources, and the logic attribute value include SUFFICIENT and NECESSARY. In the case that the logic attribute value is SUFFICIENT, a corresponding action may be triggered for the target resource in the case that any one of the plurality of dependency sub-resources is satisfied; in the case that the logic attribute value is NECESSARY, the corresponding action may be triggered for the target resource in the case that a plurality of dependency sub-resources are satisfied.

Exemplarily, the first dependency sub-resource 1 includes the first dependency condition, and the first dependency condition is that the attribute value of the second action status attribute is not equal to the first set value. It can be seen from Table 3 and 4 that the first set value is active, that is, the first dependency condition is that the attribute value of the second action status attribute is not active; the second dependency sub-resource 2 includes the second dependency condition, and the second dependency condition is that the attribute value of the second action time attribute is greater than the preset action time. It can be seen from Table 3 and 4 that, the preset action time is 72 hours, and the second dependency condition is that the attribute value of the second action time attribute is greater than 72 hours.

Exemplarily, in some embodiments, the first action resource is configured to trigger the action to close the window for the window in the case that the concentration of PM 2.5 in the air is detected to be greater than the preset threshold; the second action resource is configured to trigger the action to open the window for the window in the case that the concentration of carbon monoxide in the air is detected to be greater than the preset threshold. In the embodiment of the present disclosure, it can be seen from Table 1 to Table 4, in the case that the first trigger condition of the first action resource is satisfied, the first action may be triggered for the window where the second action is not triggered to execute or the second action is triggered to execute for more than 72 hours. The second action status attribute and the second action time attribute in the second action resource may adequately function in the dependency sub-resource in the first action resource, thereby avoiding conflicts between action trigger resources, and improving the execution efficiency of the action.

Figure 5:
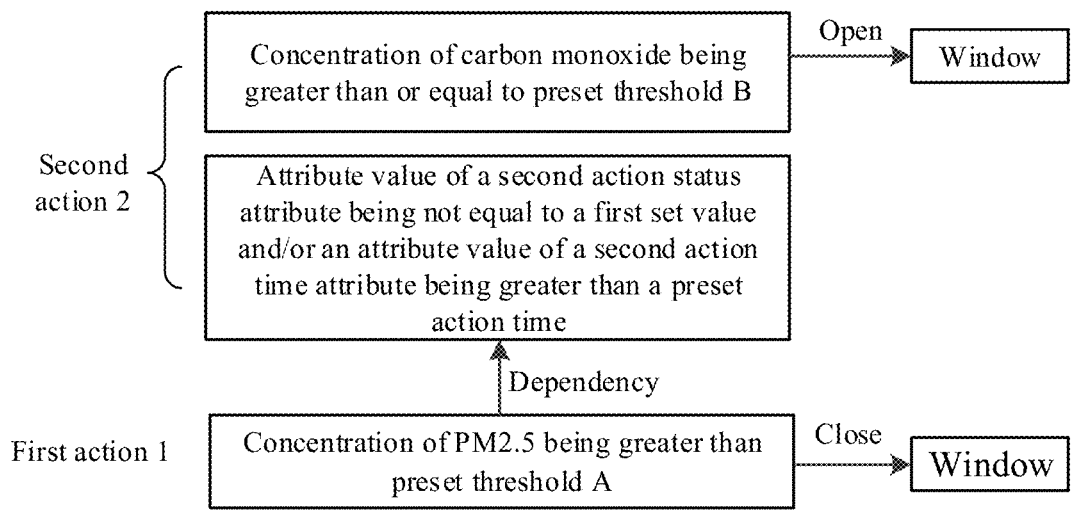
FIG. 5 is an illustrative example of creating an action resource according to an embodiment of the present disclosure.

FIG. 5 illustrates an illustrative example of creating an action resource according to an embodiment of the present disclosure. As illustrated in FIG. 5, the common service entity includes the second action resource of the second action 2. The second action 2 may be configured to open the window in response to the concentration of carbon monoxide (CO) being greater than or equal to the preset threshold B. The common service entity may receive the action resource creation request for the first action 1, and the first action 1 may be configured to close the window in response to the concentration of PM2.5 being greater than the preset threshold A.

In the example illustrated in FIG. 5, the first dependency condition of the first action 1 may set based on the second action status attribute in the second action resource of the second action 2, for example, the first dependency condition is that the attribute value of the second action status attribute is not equal to the first set value; and/or the second dependency condition of the first action 1 may set based on the second action time attribute in the second action resource of the second action 2, for example, the second dependency condition is that the attribute value of the second action time attribute is greater than the preset action time.

The first action resource of the first action 1 may be created based on the creation method in the present disclosure. The trigger condition of the first action 1 (i.e., the first trigger condition) is that the concentration of PM2.5 is greater than the preset threshold A, and the first dependency condition is that the attribute value of the second action status attribute is not equal to the first set value and/or the second dependency condition is that the attribute value of the second action time attribute is greater than the preset action time. In this case, the closing operation may be performed on the window in the case that the concentration of PM 2.5 being greater than the preset threshold A, and at least one of a case where the attribute value of the second action status attribute is not equal to the first set value and a case where the attribute value of the second action time attribute is greater than the preset action time are satisfied.

Exemplarily, in some embodiments, creating the first action resource further includes creating the first reverse action attribute and the first status control attribute for the first action resource. Exemplarily, creating the second action resource further includes creating the second reverse action attribute and the second status control attribute for the second action resource.

Figure 6A:
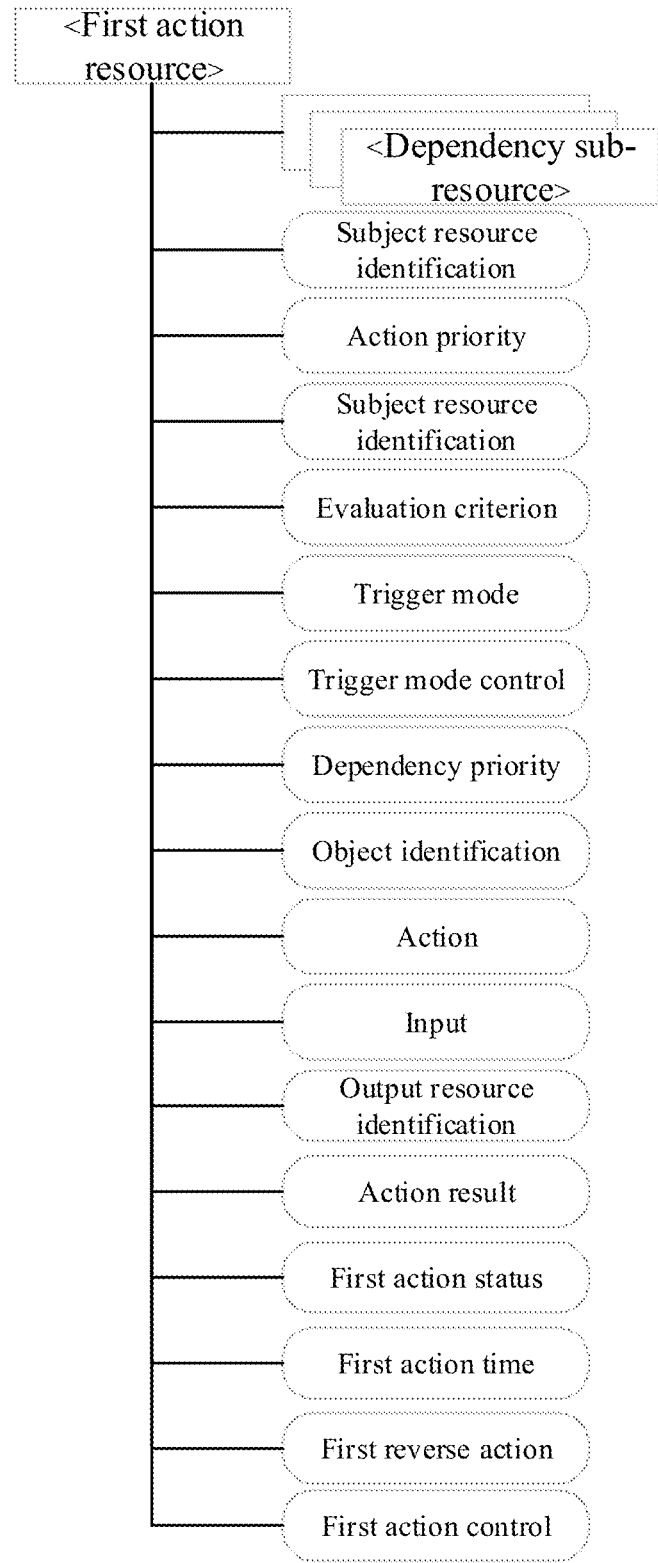
FIG. 6A is a schematic diagram of another first action resource according to some embodiments of the present disclosure.
Figure 6B:
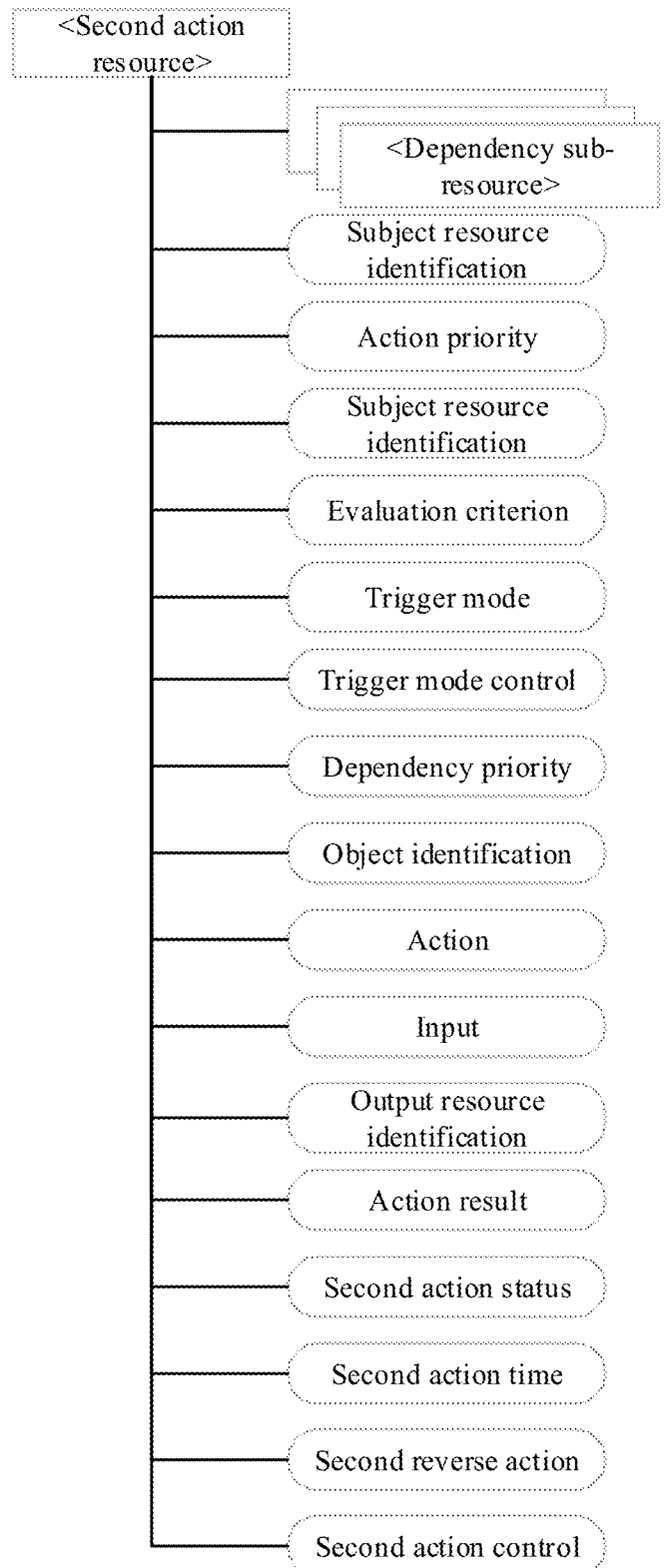
FIG. 6B is a schematic diagram of another second action resource according to some embodiments of the present disclosure.

FIG. 6A illustrates a schematic diagram of another first action resource according to some embodiments of the present disclosure, and FIG. 6B illustrates a schematic diagram of another second action resource according to some embodiments of the present disclosure.

Exemplarily, as illustrated in FIG. 6A, the first action resource further includes the first reverse action attribute and the first status control attribute; as illustrated in FIG. 6B, the second action resource further includes the second reverse action attribute and the second status control attribute.

By setting the first reverse action attribute, the first status control attribute, the second reverse action attribute, and the second status control attribute, the attribute value of the first action status attribute and the attribute value of the second action status attribute may be opposite at any time (except for the initial time).

Exemplarily, in some embodiments, the operation of turning on the cooling mode of the air conditioner may be triggered for the air conditioner in response to the temperature being higher than 27° C. (i.e., the first trigger condition), and the operation of turning off the cooling mode of the air conditioner may be triggered for the air conditioner in response to the temperature being lower than 23° C. (i.e., the second trigger condition). The first action resource may be deployed on the common service entity: the operation of turning on the cooling mode of the air conditioner being executed for the air conditioner in response to the temperature being higher than 27° C. The second action resource may further be deployed on the common service entity: the operation of turning off the cooling mode of the air conditioner being executed for the air conditioner in response to the temperature being lower than 23° C. That is, the first action is to turn on the cooling mode of the air conditioner, and the second action is to turn off cooling mode of the air conditioner. That is, the first action and the second action are opposite to each other. In this case, the first reverse action attribute indicates the identification code of the second action resource, and the second reverse action attribute indicates the identification code of the first action resource. In this case, the first action corresponding to the first action resource and the second action corresponding to the second action resource are opposite to each other. The first status control attribute indicates whether to change the attribute value of the first action status attribute or the attribute value of the second action status attribute, and the second status control attribute indicates whether to change the attribute value of the second action status attribute or the attribute value of the first action status attribute.

Exemplarily, the attribute value of the first status control attribute may include true or false, and the attribute value of the second status control attribute may further include true or false. The attribute value of the first status control attribute is true, indicating that the second action status attribute may be changed, for example, the attribute value of the second action status attribute may be changed based on the attribute value of the first action status attribute; or indicating that the first action status attribute may be changed, for example, the attribute value of the first action status attribute may be changed based on the attribute value of the second action status attribute. The attribute value of the second status control attribute is true, indicating that the first action status attribute may be changed, for example, the attribute value of the first action status attribute may be changed based on the attribute value of the second action status attribute; or indicating that the second action status attribute may be changed, for example, the attribute value of the second action status attribute may be changed based on the attribute value of the first action status attribute. The attribute value of the first status control attribute is false, indicating that the attribute value of the second action status attribute cannot be changed, for example, the attribute value of the second action status attribute cannot be changed based on the attribute value of the first action status attribute; or indicating that the attribute value of the first action status attribute cannot be changed, for example, the attribute value of the first action status attribute cannot be changed based on the attribute value of the second action status attribute. The attribute value of the second status control attribute is false, indicating that the attribute value the first action status attribute cannot be changed, for example, the attribute value of the first action status attribute cannot be changed based on the attribute value of the second action status attribute; or indicating that the attribute value of the second action status attribute cannot be changed, for example, the attribute value of the second action status attribute cannot be changed based on the attribute value of the first action status attribute. That is, in the present disclosure, the status control attribute in the action resource may indicate whether to change the attribute value of the action status attribute of the action resource, or whether to change the attribute value of the action status attribute of the action resource that is mutually exclusive with the action resource.

Exemplarily, in some examples, the attribute value of the first status control attribute is true, and the attribute value of the second status control attribute is also true. In the case that both the first action resource and the second action resource are established, at the initial phase, the attribute value of the first action status attribute of the first action resource is the second set value (i.e., inactive), and the attribute value of the second action status attribute of the second action resource is the second set value (i.e., inactive). At t1, upon triggering of the second action, the attribute value of the second action status attribute of the second action resource is changed from the second set value (i.e., inactive) to the first set value (i.e., active). In this case, because the attribute value of the second action status attribute is the first set value, and the attribute value of the first action status attribute and the attribute value of the second action status attribute are mutually exclusive, the attribute value of the first action status attribute of the first action resource is the second set value (actually not change). At t1, upon triggering of the first action, the attribute value of the first action status attribute of the first action resource is changed from the second set value to the first set value. In this case, because the attribute value of the second action status attribute is the first set value, and the attribute value of the first action status attribute and the attribute value of the second action status attribute are mutually exclusive, the attribute value of the second action status attribute of the second action resource is changed from the first set value to the second set value to ensure that the attribute value of the first action status attribute and the attribute value of the second action status attribute are opposite to each other. The above processes are repeated, such that the attribute value of the first action status attribute alternates between the first set value and the second set value subsequently, and correspondingly, the attribute value of the second action status attribute alternates between the second set value and the first set value.

Exemplarily, in some embodiments, the first action resource is configured to trigger the operation of turning on the cooling mode of the air conditioner (i.e., the first action includes the operation of turning on the cooling mode of the air conditioner) for the air conditioner (i.e., the first target resource). Exemplarily, the first action is the operation of turning on the cooling mode of the air conditioner is executed for the air conditioner in response to the temperature being higher than 27° C. The second action resource is configured to trigger the operation of turning off the cooling mode of the air conditioner (i.e., the second action includes the operation of turning off the cooling mode of the air conditioner) for the air conditioner (i.e., the second target resource). Exemplarily, the first action is the operation of turning off the cooling mode of the air conditioner is executed for the air conditioner in response to the temperature being lower than 23° C.

Table 5 shows various attribute values of the second action resource in an example of this embodiment, and Table 6 shows various attribute values of the first action resource in an example of this embodiment.

TABLE 5

| | | Action2 | | |
|---|---|---|---|---|
| Attribute value 1 | actionSubjectResource | address of<container5 (temperature sensor date container resource)> | | |
| Attribute value 2 | SubjectResourceID | identification code (ID)of<container5(temperature sensor date container resource)> | | |
| Attribute value 3 | evalCriteria | subject | 'Container5.content' | Temperature |
| | | operator | 'greater than' | greater than |
| | | threshold | '27° C.' | 27° C. |

TABLE 5-continued

| | | Action2 | | |
|---|---|---|---|---|
| Attribute value 4 | evalMode | 'periodic' | | |
| Attribute value 5 | evalControlParam | '5 s' (monitor period) | | |
| Attribute value 6 | objectResourceID | ID of<container6>(object resource: switch of air conditioner) | | |
| Attribute value 7 | actionPrimitive | to | resource address corresponding to switch resource of air conditioner (objectResourceID) | resource address |
| | | resource type | resource type corresponding to switch resource of air conditioner (objectResourceID) | resource type |
| | | content | packed date of input content of | packed date of instruction of turning on the cooling mode of air conditioner (string) content indicating an update operation |
| | | op | update | |
| | | the like | | |
| Attribute value 8 | input | turning on the cooling mode of air conditioner (string) | | |
| Attribute value 9 | outputResourceID | ID of<container7(air conditioner controller container resource)> | | |
| Attribute value 10 | actionResult | status value (action result) | | |
| Attribute value 11 | actionStatus | status value (whether the action is triggered) | | |
| Attribute value 12 | actionActiveTime | status value (time where the action is in a triggered state) | | |
| Attribute value 13 | ReverseAction | ID of<action1> | | |
| Attribute value 14 | StatusControl | TRUE | | |

Exemplarily, Table 5 shows 14 attribute values of the second action resource.

TABLE 6

| | | Action1 | | |
|---|---|---|---|---|
| First dependency sub-resource 1 | <dependency1> | | | |
| First dependency sub-resource 2 | <dependency2> | | | |
| Attribute value 1 | actionSubjectResource | address of<container5(temperature sensor date container resource)> | | |
| Attribute value 2 | SubjectResourceID | identification code (ID)of<container5(temperature sensor date container resource)> | | |
| Attribute value 3 | evalCriteria | subject | 'Container5.content' | temperature |
| | | operator | 'less than' | less than |
| | | threshold | '23° C.' | 23° C. |
| Attribute value 4 | evalMode | 'periodic' | | |
| Attribute value 5 | evalControlParam | '5 s' (monitor period) | | |
| Attribute value 6 | objectResourceID | ID of<container6>( object resource: switch of air conditioner) | | |
| Attribute value 7 | actionPrimitive | to | resource address corresponding to switch resource of air conditioner (objectResourceID) | resource address |
| | | resource type | resource type corresponding to switch resource of | resource type |

TABLE 6-continued

| | | Action1 | | |
|---|---|---|---|---|
| | | content | air conditioner (objectResourceID) packed date of input content | packed date of instruction of turning off the cooling mode of air conditioner (string) content indicating an update operation |
| | | op | update | |
| | | the like | | |
| Attribute value 8 | input | turning off the cooling mode of air conditioner (string) | | |
| Attribute value 9 | outputResourceID | ID of<container3(air conditioner controller container resource)> | | |
| Attribute value 10 | actionResult | status value (action result) | | |
| Attribute value 11 | actionStatus | status value (whether the action is triggered) | | |
| Attribute value 12 | actionActiveTime | status value (time where the action is in a triggered state ) | | |
| Attribute value 13 | ReverseAction | ID of<action2> | | |
| Attribute value 14 | StatusControl | TRUE | | |

Exemplarily, Table 6 shows 14 attribute values, the first dependency sub-resource 1, and the second dependency sub-resource 2 of the first action resource.

Table 7 shows the first dependency sub-resource 1 of the first action resource; Table 8 shows the second dependency sub-resource 2 of the first action resource.

TABLE 7

| Attribute value 1 | logic | SUFFICIENT(relationship between <dependency>) | | |
|---|---|---|---|---|
| Attribute value 2 | dependencyResourceID | ID of<action2>(<action2> resource) | | |
| Attribute value 3 | evalCriteria | subject | 'Action2.status' | corresponding actionStatus of <action2> |
| | | operator | 'not equals' | not equal to |
| | | threshold | 'active' | active |

TABLE 8

| Attribute value 1 | logic | SUFFICIENT(relationship between <dependency>) | | |
|---|---|---|---|---|
| Attribute value 2 | dependencyResourceID | ID of<action2>(<action2> resource) | | |
| Attribute value 3 | evalCriteria | subject | 'Action2.activeTime' | corresponding actionActiveTime of <action2> |
| | | operator | 'greater than' | greater than |
| | | threshold | '5 min' | 5 minutes |

Exemplarily, the first dependency sub-resource 1 includes the first dependency condition, the first dependency condition is that the attribute value of the second action status attribute is not equal to the first set value, and the first set value is active from Table 7 and Table 8; the second dependency sub-resource 2 includes the second dependency condition, the second dependency condition is that the attribute value of the second action time attribute is greater than the preset action time, and the preset action time is 5 minutes from Tables 3 and 4.

Exemplarily, in some examples, where the position of the temperature sensor is unreasonable, the accuracy of performing refrigeration of the air conditioner is not high. Exemplarily, where the temperature sensor is located proximal to the air outlet of the air conditioner, the temperature proximal to the air outlet of the air conditioner air conditioner is about 15° C. with cold wind, although the temperature of the air conditioner is adjusted to 25° C. Exemplarily, at t1, in the case that the temperature monitored by the temperature sensor is higher than 27° C., the second action is triggered to execute. That is, the air conditioner is turned on to achieve refrigeration, and the air conditioning begins to cool; at t2, the temperature monitored by the temperature sensor is changed to about 15° C., and the first action is immediately triggered to turn off the air conditioner. The interval between t1 and t2 is short (e.g., 1 minute, 2 minutes, or the like), such that the temperature does not decrease lower than 27° C. at t2. At t3, the temperature monitored by the temperature sensor is higher than 27° C., and the second action is again triggered to execute. Therefore, the first action and second action are triggered repeatedly within a short period, so as not to cool.

In the embodiments of the present disclosure illustrated in Table 5 to Table 8, at t1, the temperature is higher than 27° C., i.e., the temperature monitored by the temperature sensor satisfies the second trigger condition (the temperature is higher than 27° C.). The second action is triggered to execute, and the air conditioner is turned on to achieve refrigeration. In this case, the attribute value of the second action status attribute is the first set value, and the attribute value of the first action status attribute is the second set value; at t2, while the temperature monitored by the temperature sensor is changed to about 15° C., i.e., the temperature monitored by the temperature sensor satisfies the first trigger condition (the temperature is lower than 23° C.). The first action cannot be triggered because the attribute value of the second action status attribute is the first set value, i.e., the attribute value of the second action status attribute does not satisfy the first dependency condition in the first dependency sub-resource of the first action resource. The interval between t2 and t1 is 1 minute, i.e., the attribute value of the second action time attribute is 1 minute, i.e., the attribute value of the second action time attribute does not satisfy the second dependency condition in the second dependency sub-resource of the first action resource, such that the first action cannot be triggered. At t4, the temperature monitored by the temperature sensor (e.g., about 15° C.) satisfies the first trigger condition (the temperature is lower than 23° C.). The attribute value of the second action status attribute (the first set value) does not satisfy the first dependency condition in the first dependency sub-resource of the first action resource, however, the attribute value of the second action time attribute satisfies the second dependency condition in the second dependency sub-resource of the first action resource, because the interval between t4 and t1 is 6 minutes, i.e., the attribute value of the second action time attribute is 6 minutes. In this case, execution of the first action is triggered, the air conditioner is turned off. The attribute value of the first action status attribute becomes the first set value, and the attribute value of the second action status attribute becomes the second set value. At t4, as the period of turning on the cooling mode of the air conditioner is longer (e.g., 6 minutes), the temperature may be lower than 27° C. at t4, such that the second action is not immediately triggered upon turning off of the air conditioner, and execution of the second action is triggered again in the case that the temperature monitored by the temperature sensor is higher than 27° C. Therefore, the first action resource and the second action resource do not conflict with each other, the air conditioner is thermostatically set based on the first action resource and the second action resource, and the temperature sensor may be set at any location.

It should be noted that, each time the first action is triggered, the attribute value of the first action time attribute may be reset, that is, the attribute value of the first action time attribute is cleared. Similarly, each time the second action is triggered, the attribute value of the second action time attribute may further be reset, that is, the attribute value of the second action time attribute is cleared.

Figure 7:
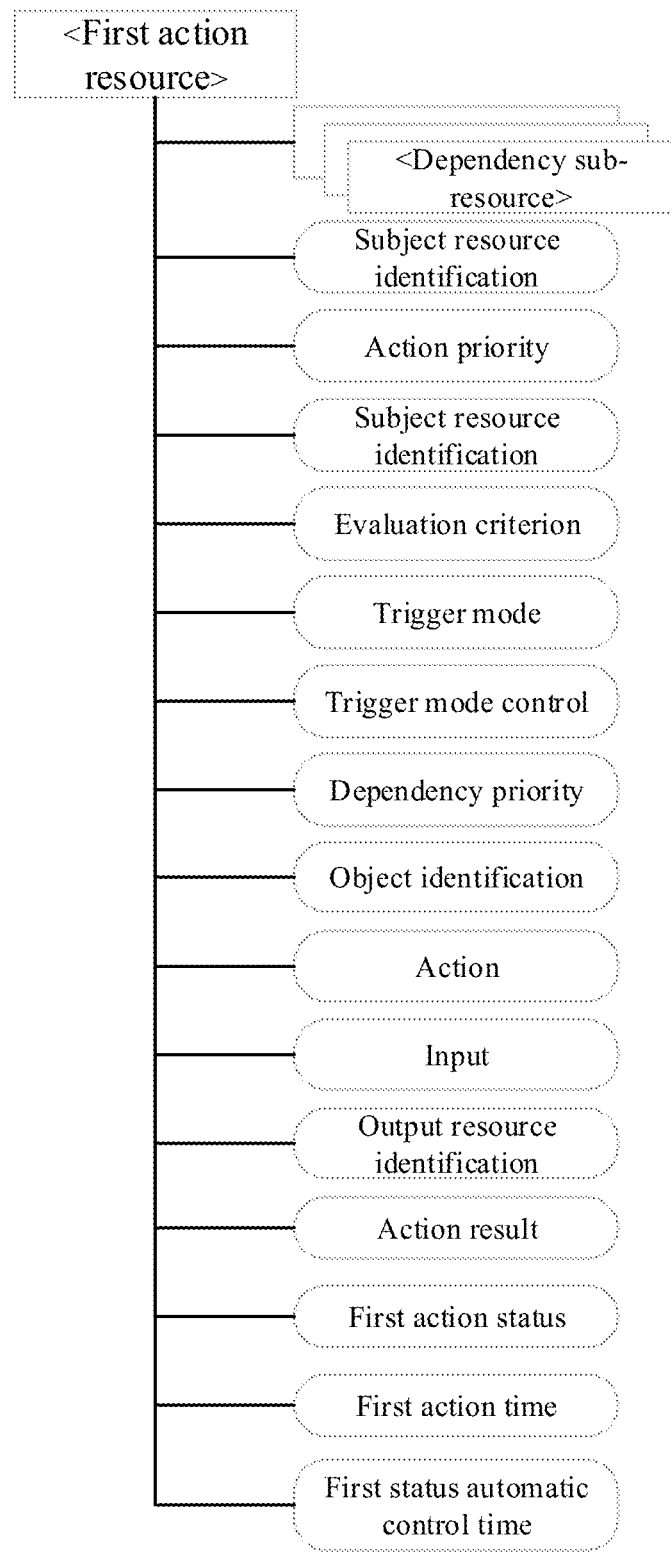
FIG. 7 is a schematic diagram of yet another first action resource according to some embodiments of the present disclosure.

FIG. 7 illustrates a schematic diagram of yet another first action resource according to some embodiments of the present disclosure.

Exemplarily, in some embodiments, creating the first action resource further includes creating a first status automatic time attribute for the first action resource.

Exemplarily, as illustrated in FIG. 7, the first action resource further includes the first status automatic control time attribute (StatusAutoControl).

Exemplarily, the attribute value of the first action status attribute includes the first set value and the second set value, and the first set value and the second set value are opposite to each other.

Exemplarily, in some examples, the first status automatic control time may represent that the attribute value of the first action status attribute is changed from the first set value to the second set value in the case that the attribute value of the first action status attribute is the first set value and the attribute value of the first action time attribute is greater than or equal to the attribute value of the first status automatic control time attribute. Exemplarily, the attribute value of the first operation status attribute is set to the first set value in response to the first action being triggered, and the attribute value of the first operation status attribute may be changed from the first set value to the second set value in the case that the duration of the first action execution is greater than or equal to the attribute value of the first status automatic control time attribute.

Exemplarily, in other examples, the first status control time may further represent that the attribute value of the first action status attribute is changed from the first set value to the second set value in the case that the attribute value of the first action status attribute is the first set value and the attribute value of the first status automatic control time attribute is equal to 0. Exemplarily, the attribute value of the first operation status attribute is set to the first set value in response to the first action being triggered, and the duration of executing the first action is equal to the attribute value of the first status automatic control time attribute in the case that the attribute value of the first status automatic control time attribute is counted down, and the attribute value of the first status automatic control time attribute is equal to 0, such that the attribute value of the first operation status attribute may be changed from the first set value to the second set value.

Exemplarily, in some embodiments, creating the second action resource further includes creating the second status automatic control time attribute for the second action resource.

Exemplarily, the attribute value of the second action status attribute includes a first set value and a second set value, and the first set value and the second set value are opposite to each other. In some examples, the second status automatic time indicates that the attribute value of the second action status attribute is changed from the first set value to the second set value in the case that the attribute value of the second action status attribute is the first set value and the attribute value of the second action time attribute is greater than or equal to the attribute value of the second status automatic time attribute. In other examples, the second status automatic control time attribute may further represent that the attribute value of the second action status attribute is changed from the first set value to the second set value in the case that the attribute value of the second action status attribute is the first set value and the attribute value of the second status automatic control time attribute is equal to 0.

Exemplarily, in some embodiments, the first action resource may be configured to trigger the opening operation (i.e., the first action) for the window (i.e., the first target resource). Exemplarily, the opening operation is performed on the window in the case that the concentration of carbon monoxide in the air is greater than the preset threshold B (e.g., 20%). Table 9 shows the various attribute values of the first action resource in an example of this embodiment.

TABLE 9

| | | Action1 | | |
|---|---|---|---|---|
| Attribute value 1 | actionSubjectResource | address of<container1(carbon monoxide sensor date container resource)> | | |
| Attribute value 2 | SubjectResourceID | identification code (ID)of<container1(carbon monoxide sensor date container resource)> | | |
| Attribute value 3 | evalCriteria | subject | 'Container1.content' | concentration of carbon monoxide |
| | | operator | 'greater than' | greater than |
| | | threshold | '50 ppm' | 50 ppm |
| Attribute value 4 | evalMode | 'periodic' | | |
| Attribute value 5 | evalControlParam | '5 s' (monitor period) | | |
| Attribute value 6 | objectResourceID | ID of<container2>(object resource: switch of window) | | |
| Attribute value 7 | actionPrimitive | to | resource address corresponding to switch resource of window (objectResourceID) | resource address |
| | | resource type | resource type corresponding to switch resource of window (objectResourceID) | resource type |
| | | content | packed date of input content | packed date of open instruction (string) |
| | | op | update | indicating an update operation |
| | | the like | | |
| Attribute value 8 | input | open instruction (string) | | |
| Attribute value 9 | outputResourceID | ID of<container3(window controller container resource)> | | |
| Attribute value 10 | actionResult | status value (action result) | | |
| Attribute value 11 | actionStatus | status value (whether the action is triggered) | | |
| Attribute value 12 | actionActiveTime | status value (time where the action is in a triggered state) | | |
| Attribute value 13 | ReverseAction | N/A | | |
| Attribute value 14 | StatusControl | N/A | | |
| Attribute value 15 | StatusControl | '6 h' | | |

Exemplarily, Table 9 shows 15 attribute values of the second action resource. The attribute value 13 and the attribute value 14 are null, i.e., the two attribute values point to empty.

Exemplarily, in the example illustrated in Table 9, in the case that the concentration of carbon monoxide in the air is greater than the preset threshold, the first action, i.e., the operation of opening the window is triggered for the window. In the case that the attribute value of the first action status attribute is the first set value, and the duration upon triggering of the first action is greater than the attribute value of the first status automatic control time attribute, the attribute value of the first operation status attribute is changed from the first set value to the second set value (e.g., 6 hours in Table 9).

Figure 8A:
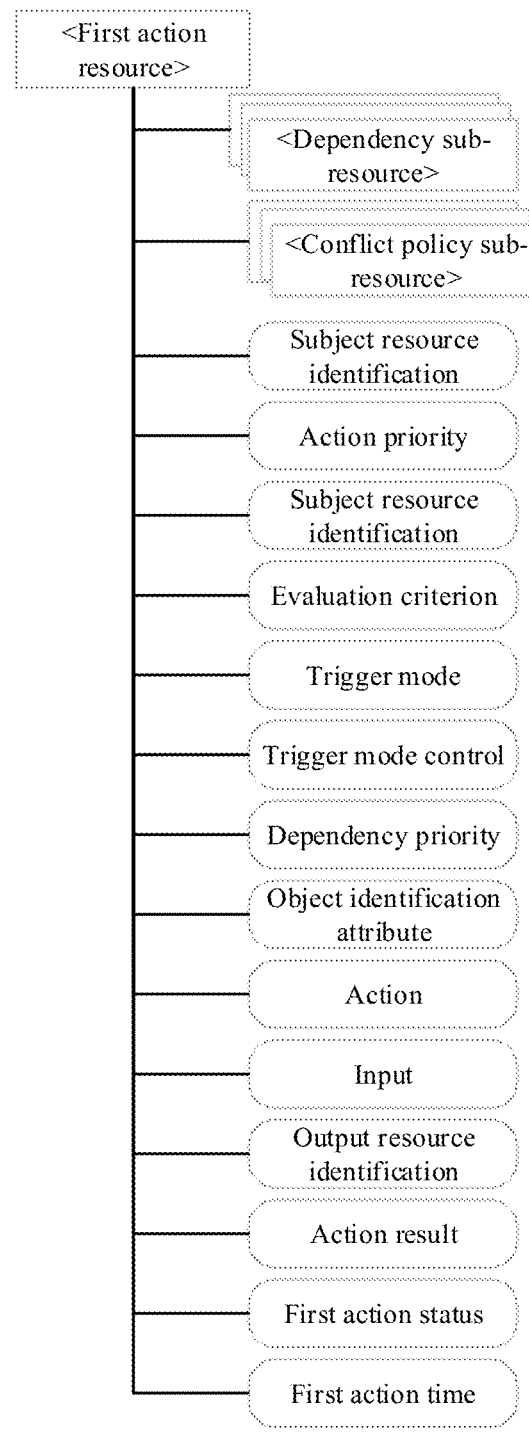
FIG. 8A is a schematic diagram of yet another first action resource according to some embodiments of the present disclosure.

FIG. 8A illustrates a schematic diagram of yet another first action resource according to some embodiments of the present disclosure, and FIG. 8B illustrates a schematic diagram of a conflict policy sub-resource in the first action resource according to some embodiments of the present disclosure.

Exemplarily, in some embodiments, the first creation request further includes the conflict policy resource information.

Exemplarily, creating the first action resource further includes creating the conflict policy sub-resource for the first action resource based on the conflict policy resource information.

Exemplarily, in the case that the first action resource includes the conflict policy sub-resource, creating the first action resource may further include creating the first dependency sub-resource for the first action resource in the case that the second target resource, the second action, and the conflict policy sub-resource satisfy the matching condition. Or, creating the first action resource further includes: creating the second dependency sub-resource for the first action resource in the case that the second target resource, the second action, and the conflict policy sub-resource satisfy the matching condition. Or, creating the first action resource further includes creating the first dependency sub-resource and the second dependency sub-resource for the first action resource in the case that the second target resource, the second action, and the conflict policy sub-resource satisfy the matching condition.

Exemplarily, the first dependency sub-resource includes the first dependency condition, and the first dependency condition is associated with the second action status attribute. The second dependency sub-resource includes the second dependency condition, and the second dependency condition is associated with the second action time attribute. The first action is triggered for the first target resource in the case that at least one of the first dependency condition or the second dependency condition, and the first trigger condition are satisfied. Exemplarily, the first action is triggered for the first target resource in the case that the first action resource includes the first dependency sub-resource, and the first dependency condition and the first trigger condition are simultaneously satisfied; the first action is triggered for the first target resource in the case that the first action resource includes the second dependency sub-resource, and the first dependency sub-resource and the second dependency sub-resource are simultaneously satisfied; and the first action is triggered for the first target resource in the case that the first action resource includes the first dependency sub-resource and the second dependency sub-resource, and at least one of the first dependency condition or the second dependency condition, and the first trigger condition are satisfied.

Exemplarily, as illustrated in FIG. 8A, the first action resource further includes the conflict policy sub-resource (conflictPolicy).

Exemplarily, creating the conflict policy sub-resource for the first action resource includes creating a conflict target resource identification attribute and a conflict execution method attribute for the first action resource.

Exemplarily, as illustrated in FIG. 8B, the conflict policy sub-resource includes a conflict target resource identification attribute (conflictObjectResourceID) and a conflict execution method attribute (conflictInput). Exemplarily, the conflict target resource identification attribute indicates the identification code of the first target resource, and the conflict execution method attribute indicates the action that conflicts with the first action.

Exemplarily, the matching condition is that the identification codes of the second target resource and the conflict target resource identification attribute are the same, and the second action and the action represented by the conflict execution method attribute are the same.

Exemplarily, in some embodiments, creating the conflict policy sub-resource for the first action resource further includes creating a conflict status attribute for the first action resource.

Exemplarily, as illustrated in FIG. 8B, the conflict policy sub-resource includes the conflict status attribute (conflictStatus), the attribute value of the conflict status attribute may include the first set value or the second set value. Exemplarily, the first target resource and the second target resource are the same target resource, and the first action and the second action conflict with each other, indicating that the second target resource, the second action, and the conflict policy sub-resource satisfy the matching condition. In this case, the attribute value of the conflict status attribute is set as the first set value, indicating that the second action cannot be triggered in the case that the attribute value of the second action status attribute is the first set value, and the second action can be triggered in the case that the attribute value of the second action status attribute is the second set value; the attribute value of the conflict status attribute is set as the second set value, indicating that the second action cannot be triggered in the case that the attribute value of the second action status attribute is the second set value, and the second action can be triggered in the case that the attribute value of the second action status attribute is the first set value.

Exemplarily, in the case that the attribute value of the conflict status attribute is the first set value, the first dependency condition is that the attribute value of the second action status attribute is not equal to the first set value. The first set value is active or inactive. In the case that the attribute value of the conflict status attribute is the second set value, the first dependency condition is that the attribute value of the second action status attribute is not equal to the second set value. The second dependency condition is that the attribute value of the second action time attribute is greater than the preset action time.

Exemplarily, in some examples, the second action resource is deployed on the common service entity. The second action resource is configured to trigger the second action for the second target resource, the second target resource is the window, and the second action includes the opening operation, i.e., the operation of opening the window. For the first action resource, the first action resource is configured to trigger the first action for the first target resource. Where the second target resource and the first target resource are the same, i.e., the first target resource is also the window, the first action includes the closing operation, i.e., the operation of closing the window. In order to prevent the first action resource and the second action resource from generating the conflict, in the case that the first action resource is created, the dependency resource associated with the first action resource and second action resource may be automatically added by the common service entity based on the conflict policy sub-resource of the first action resource, i.e., the first dependency sub-resource and/or the second dependency sub-resource associated with the second action resource may be established based on the first action resource. The first dependency sub-resource may include the first dependency condition, and in the case that the attribute value of the conflict status attribute is the first set value, the first dependency condition is that the attribute value of the second action status attribute is not equal to the first setting value. The second dependency sub-resource includes the second dependency condition, and the second dependency condition is that the attribute value of the second action time attribute is greater than the preset action time.

Exemplarily, in some embodiments, the first action resource is configured to trigger the operation of closing the window (i.e., the first action) for the window (i.e., the first target resource). Exemplarily, the closing operation is performed on the window in response to the concentration of PM2.5 in the air being greater than the preset threshold A. The second action resource is configured to trigger the operation of opening the window (i.e., the second action) for the window (i.e., the second target resource). Exemplarily, the opening operation is performed on the window in response to the concentration of carbon monoxide in the air being greater than the preset threshold B.

Table 10 illustrates various attribute values of the second action resource in an example of this embodiment, and Table 11 illustrates various attribute values of the first action resource in an example of this embodiment.

TABLE 10

| | | Action2 | | |
|---|---|---|---|---|
| Attribute value 1 | actionSubjectResource | address of<container1 (carbon monoxide sensor date container resource)> | | |
| Attribute value 2 | SubjectResourceID | identification code (ID)of<container1 (carbon monoxide sensor date container resource)> | | |
| Attribute value 3 | evalCriteria | subject | 'Container1.content' | concentration of carbon monoxide greater than 50 ppm |
| | | operator | 'greater than' | |
| | | threshold | '50 ppm' | |
| Attribute value 4 | evalMode | 'periodic' | | |
| Attribute value 5 | evalControlParam | '5 s' (monitor period) | | |
| Attribute value 6 | objectResourceID | ID of<container2>(object resource: switch of window) | | |
| Attribute value 7 | actionPrimitive | to | resource address corresponding to switch resource of window (objectResourceID) corresponding resource type | resource address |
| | | resource type | resource type corresponding to switch resource of window (objectResourceID) | resource type |
| | | content | packed date of input content | packed date of open instruction (string) content of indicating an update operation |
| | | op | update | |
| | | the like | | |
| Attribute value 8 | input | open instruction (string) | | |
| Attribute value 9 | outputResourceID | ID of<container3(window controller container resource)> | | |
| Attribute value 10 | actionResult | status value (action result) | | |
| Attribute value 11 | actionStatus | status value (whether the action is triggered) | | |
| Attribute value 12 | actionActiveTime | status value (time where the action is in a triggered state) | | |

TABLE 11

| | | Action1 | | |
|---|---|---|---|---|
| First dependency sub-resource 1 | <dependency1> | | | |
| First dependency sub-resource 2 | <conflictPolicy> | | | |
| Attribute value 1 | actionSubjectResource | address of<container4(air quality sensor date container resource)> | | |
| Attribute value 2 | SubjectResourceID | identification code (ID)of<container4(air quality sensor date container resource)> | | |
| Attribute value 3 | evalCriteria | subject | 'Container.4.content' | concentration of PM2.5 greater than 150 |
| | | operator | 'greater than' | |
| | | threshold | '150' | |
| Attribute value 4 | evalMode | 'periodic' | | |
| Attribute value 5 | evalControlParam | '5 s' (monitor period) | | |
| Attribute value 6 | objectResourceID | ID of<container2>(object resource: switch of window) | | |
| Attribute value 7 | actionPrimitive | to | resource address corresponding to switch resource of window (objectResourceID) | resource address |
| | | resource | resource type | resource type |

TABLE 11-continued

| | | Action1 | | |
|---|---|---|---|---|
| | | type | corresponding to switch resource of window (objectResourceID) | |
| | | content | packed date of input content | packed date of close instruction (string) content |
| | | op | update | indicating an update operation |
| | | the like | | |
| Attribute value 8 | input | close instruction (string) | | |
| Attribute value 9 | outputResourceID | ID of<container3 (window controller container resource)> | | |
| Attribute value 10 | actionResult | status value (action result) | | |
| Attribute value 11 | actionStatus | status value (whether the action is triggered) | | |
| Attribute value 12 | actionActiveTime | status value (time where the action is in a triggered state ) | | |

Table 12 shows the conflict policy sub-resources of the first action resource.

TABLE 12

| Attribute value 1 | conflictObjectResourceID | ID of<container2>(object resource: switch of window) |
|---|---|---|
| Attribute value 2 | conflictInput | close instruction (string) |
| Attribute value 3 | conflictStatus | active |

Exemplarily, as illustrated in Table 12, the conflict policy sub-resource includes three attribute values, and the three attribute values are the conflict target resource identification attribute (conflictObjectResourceID), the conflict execution method attribute (conflictInput), and the conflict status attribute (conflictStatus).

As illustrated in Tables 10 to 12, in the case that the first action resource is created, it can be seen based on the conflict policy sub-resource of the first action resource that the first action resource and the second action resource are matched, such that the common service entity automatically creates the first dependency sub-resource 1 associated with the second action resource based on the first action resource, and Table 13 illustrates the first dependency sub-resource 1 of the first action resource.

TABLE 13

| Attribute value 1 | logic | NECESSARY((relationship between <dependency>) | | |
|---|---|---|---|---|
| Attribute value 2 | dependencyResourceID | ID of<action2>(<action2> resource) | | |
| Attribute value 3 | evalCriteria | subject | 'Action2.status' | corresponding actionStatus of <action2> |
| | | operator | 'not equals' | not equal to |
| | | threshold | 'active' | active |

Exemplarily, in other examples, the third action resource and the fourth action resource are further deployed on the common service entity. The third target resource of the third action resource is the window, and the third action corresponding to the third action resource includes the opening operation. The fourth target resource of the fourth action resource is the window, and the fourth action corresponding to the fourth action resource includes the opening operation. That is, the third action resource and the fourth action resource are also matched with the first action resource to prevent the first action resource from conflicting with any of the third action resource and the fourth action resource. In the case that the first action resource is created, the dependency sub-resource associated with the third action resource and the dependency sub-resource associated with the fourth action resource may be automatically added by the common service entity based on the conflict policy sub-resource of the first action resource. That is, the third dependency sub-resource and/or the fourth dependency sub-resource associated with the third action resource, the fifth dependency sub-resource and/or the sixth dependency sub-resource associated with the fourth action resource may be established based on the first action resource. The third dependency sub-resource may include the third dependency condition, and the third dependency condition is associated with the third action status attribute of the third action resource. The third dependency condition is that the attribute value of the third action status attribute is not equal to the first set value in the case that the attribute value of the conflict condition attribute is the first set value. The fourth dependency sub-resource includes the fourth dependency condition, the fourth dependency condition is associated with the third action time attribute of the third action resource, and the fourth dependency condition is that the attribute value of the third action time attribute is greater than the preset action time. The fifth dependency sub-resource may include the fifth dependency condition, and the fifth dependency condition is associated with the fourth action status attribute of the fourth action resource. The fifth dependency condition is that the attribute value of the fourth action status attribute is not equal to the first set value in the case that the attribute value of the conflict condition attribute is the first set value. The sixth dependency sub-resource includes the sixth dependency condition, the sixth dependency condition is associated with the fourth action time attribute of the fourth action resource, and the sixth dependency condition is that the attribute value of the fourth action time attribute is greater than the preset action time.

For details about the third dependency sub-resource and the fifth dependency sub-resource, reference may be made to the above description of the first dependency sub-resource; and for details about the detailed description of the fourth dependency sub-resource and the sixth dependency sub-resource, reference may be made to the description of the second dependency sub-resource.

As illustrated in Tables 10 to 12, in the case that the first action resource is created, it can be seen based on the conflict policy sub-resource of the first action resource that the first action resource and the third action resource are matched, such that the common service entity automatically creates the third dependency sub-resource associated with the third action resource based on the first action resource, and the first action resource and the fourth action resource are matched, such that the common service entity automatically creates the fifth dependency sub-resource associated with the fourth action resource based on the first action resource. Table 14 shows the third dependency sub-resource of the first action resource, and Table 15 shows the fifth dependency sub-resource of the first action resource.

TABLE 14

| Attribute value 1 | logic | NECESSARY(relationship between <dependency>) | | |
|---|---|---|---|---|
| Attribute value 2 | dependencyResourceID | ID of<action3>(<action3> resource) | | |
| Attribute value 3 | evalCriteria | subject | 'Action3.status' | corresponding actionStatus of <action3> |
| | | operator | 'not equals' | not equal to |
| | | threshold | 'active' | active |

TABLE 15

| Attribute value 1 | logic | NECESSARY(relationship between <dependency>) | | |
|---|---|---|---|---|
| Attribute value 2 | dependencyResourceID | ID of<action4>(<action4> resource) | | |
| Attribute value 3 | evalCriteria | subject | 'Action4.status' | corresponding actionStatus of <action4> |
| | | operator | 'not equals' | not equal to |
| | | threshold | 'active' | active |

It can be seen from the aforementioned Tables 13 to 15 that, as the relationship between the first dependency sub-resource, the third dependency sub-resource and the fifth dependency sub-resource of the first action resource is necessary, the first action corresponding to the first action resource may be triggered only in the case that the attribute value of the second action status attribute of the second action resource, the attribute value of the third action status attribute of the third action resource, and the attribute value of the fourth action status attribute of the fourth action resource are all the second set value (i.e., inactive).

It is noted that, in the present disclosure, the description of the first action resource is applied to the second action resource without conflict. That is, for example, the second action resource may further include the status automatic control time attribute; the second creation request may further include conflict policy resource information, and the second action resource may further include the conflict policy sub-resource, and the like.

FIG. 9 illustrates a schematic diagram of an execution method of an action according to some embodiments of the present disclosure. Exemplarily, as illustrated in FIG. 9, the method for executing the action may include the following processes.

In S301, the first action resource is determined, wherein the first action resource is configured to trigger the first action for the first target resource, the first action resource includes the first action status attribute, and the first action status attribute indicates the status of the first action.

In S302, the first action is triggered for the first target resource.

In S303, the attribute value of the first action status attribute is set to the first set value in response to the first action being triggered.

With the method for executing the actions according to the present disclosure, by increasing the action status attribute in the action resource, the conflict problem of the action resource may be resolved based on the dependency condition associated with the action status attribute, thereby improving the execution efficiency of the action.

Exemplarily, in some embodiments, S302 may include: receiving the first data resource; and triggering the first action for the first target resource in response to the first data resource satisfying the first trigger condition. It should be noted that, in the present disclosure, triggering the first action means performing the first action.

Exemplarily, in some embodiments, sensor data may be received by various sensors to determine the first data resource (which may also be referred to as a first subject resource). Exemplarily, the first data resource may be the concentration of carbon monoxide, the concentration of PM2.5, the temperature, or the like. Exemplarily, in the smart home use environment, sensor data may be received by sensors such as the carbon monoxide sensor, a rain sensor, the air quality monitor sensor, or the like, and the first data resource is updated based on the received sensor data. The first action corresponding to the first action resource indicates that the closing operation is performed on the window in response to the concentration of PM2.5 in the air being greater than the preset threshold A (e.g., 100). In this case, the first data resource is the concentration of PM2.5 detected by the air quality monitor sensor, and the closing operation may be performed on the window in response to the concentration of PM2.5 being greater than 100.

Exemplarily, the application entity (e.g., the sensor) may transmit data to the common service entity to update the first data resource. Such an update may be performed in real time or periodic, or may be triggered by a condition. Exemplarily, the date greater than the threshold may be transmitted to the common service entity to update in the case that the data detected by the application entity reaches a threshold, or may be updated in the case that the first data resource is acquired by another application entity.

Exemplarily, in some embodiments, the first action resource further includes the first action time attribute, and the first action time attribute indicates the time parameter associated with the first action. The time parameter associated with the first action may include at least one of the duration in response to triggering the first action, the start time of performing the first action, and the end time of performing the first action.

Exemplarily, the execution method further includes setting the attribute value of the first action time attribute upon triggering of the first action. Exemplarily, setting the attribute value of the first action time attribute includes: upon triggering of the first action, establishing an action execution timer to start clocking, and taking the time value of the action execution timer as the attribute value of the first action time attribute. Exemplarily, the action execution timer is clocked from 0.

Exemplarily, in some embodiments, the first action resource further includes the first status automatic control time attribute.

Exemplarily, in some examples, the first status automatic control time attribute may indicate: the attribute value of the first action status attribute is changed from the first set value to the second set value in the case that the attribute value of the first action status attribute is the first set value, and the attribute value of the first action time attribute is greater than or equal to the attribute value of the first status automatic control time attribute. Exemplarily, upon triggering of the first action, the execution method further includes: acquiring the attribute value of the first action time attribute; determining whether the attribute value of the first action time attribute is greater than or equal to the attribute value of the first status automatic control time attribute, and changing the attribute value of the first action status attribute from the first set value to the second set value in response to the attribute value of the first action time attribute being greater than or equal to the attribute value of the first status automatic control time attribute.

Exemplarily, in other examples, the first status control time may further indicate that the attribute value of the first action status attribute is changed from the first set value to the second set value in the case that the attribute value of the first action status attribute is the first set value, and the attribute value of the first status automatic control time attribute is equal to 0. Exemplarily, upon triggering of the first action, the execution method further includes: counting down the attribute value of the first status automatic control time attribute; acquiring the attribute value of the first status automatic control time attribute; determining whether the attribute value of the first status automatic control time attribute is equal to 0, and changing the attribute value of the first action status attribute from the first set value to the second set value in response to the attribute value of the first status automatic control time attribute being equal to 0.

Exemplarily, the first set value and the second set value are opposite from each other. In some examples, the first set value may be active, and the second set value may be inactive.

Exemplarily, in some examples, the first action resource further includes the first dependency sub-resource, and the first dependency sub-resource includes the first dependency condition. The process S302 may include: receiving the first data resource; acquiring the second action status attribute of the second action resource, wherein the second action resource is configured to trigger the second action for the second target resource, the second action resource includes the second action status attribute, and the second action status attribute indicates the status of the second action; triggering the first action for the first target resource in response to the first data resource satisfying the first trigger condition and the attribute value of the second action status attribute satisfying the first dependency condition. That is, in the case that the first action resource includes the first dependency sub-resource, the first action needs to be triggered for the first target resource where the first data resource satisfies the first trigger condition and the attribute value of the second action status attribute satisfies the first dependency condition.

Exemplarily, in other examples, the first action resource further includes the second dependency sub-resource, and the second dependency sub-resource includes the second dependency condition. The process S302 may include receiving the first data resource; acquiring the second action time attribute of the second action resource, wherein the second action resource is configured to trigger the second action for the second target resource, the second action resource includes the second action time attribute, and the second action time attribute indicates the time parameter associated with the second action; triggering the first action for the first target resource in response to the first data resource satisfying the first trigger condition and the attribute value of the second action time attribute satisfying the second dependency condition. That is, in the case that the first action resource includes the first dependency sub-resource, the first action needs to be triggered for the first target resource where the first data resource satisfies the first trigger condition and the attribute value of the second action time attribute satisfies the second dependency condition.

Exemplarily, in yet other examples, the first action resource further includes the first dependency sub-resource including the first dependency condition, and the second dependency sub-resource including the second dependency condition. The process S302 may include receiving the first data resource; acquiring the second action status attribute and the second action time attribute of the second action resource, wherein the second action resource is configured to trigger the second action for the second target resource, the second action resource includes the second action status attribute and the second action time attribute, the second action status attribute indicates the status of the second action, and the second action time attribute indicates the time parameter associated with the second action; triggering the first action for the first target resource in response to the first data resource satisfying the first trigger condition and the attribute value of the second action status attribute satisfying the first dependency condition and/or the attribute value of the second action time attribute satisfying the second dependency condition. That is, in the case that the first action resource includes the first dependency sub-resource and the second dependency sub-resource, the first action may be triggered for the first target resource where the first data resource satisfies the first trigger condition, and any of the case that the attribute value of the second action status attribute satisfies the first dependency condition and the case that the attribute value of the second action time attribute satisfies the second dependency condition is satisfied.

Exemplarily, the first dependency condition is that the attribute value of the second action status attribute is not equal to the first set value, and the first set value is active or inactive. The second dependency condition is that the attribute value of the second action time attribute is greater than the preset action time.

Exemplarily, the first target resource and the second target resource are the same target resource.

Exemplarily, the first action and the second action are different. That is, the first action and the second action conflict with each other.

Exemplarily, the execution method may further include: upon triggering of the first action, the attribute value of the second action status attribute is set to the second set value, wherein the first set value and the second set value are opposite to each other; determining the second action resource; receiving the second data resource; triggering the second action for the second target resource in response to the second data resource satisfying the second trigger condition, changing the attribute value of the second action status attribute from the second set value to the first set value upon triggering of the second action, and changing the attribute value of the first action status attribute from the first set value to the second set value. In this embodiment, the first action and the second action are opposite to each other. Exemplarily, the first action is the opening operation, and the second action is the closing operation. It is noted that in the present disclosure, to trigger the second action may indicate to perform the second action.

Exemplarily, in an embodiment, the first action resource further includes the first reverse action attribute and the first status control attribute, and the second action resource further includes the second reverse action attribute and the second status control attribute. The first reverse action attribute indicates the identification code of the second action resource, and the second reverse action attribute indicates the identification code of the first action resource.

Exemplarily, in some examples, prior to performing the operation of setting the attribute value of the second action status attribute to the second set value, the execution method further includes: determining whether the attribute value of the first status control attribute is true, performing the operation of setting the attribute value of the second action status attribute to the second set value in the case that the attribute value of the first status control attribute is determined to be true, and not performing the operation of setting the attribute value of the second action status attribute to the second set value in the case that the attribute value of the first status control attribute is determined to be not true. That is, upon triggering of the first action, whether the attribute value of the first status control attribute is true is first determined. Where the attribute value of the first status control attribute is determined to be true, the attribute value of the second action status attribute is set to the second set value, and the attribute value of the second action status attribute is not operated in the case that the attribute value of the first status control attribute is not true.

Exemplarily, in other examples, prior to performing the operation of setting the attribute value of the second action status attribute to the second set value, the execution method further includes: determining whether the attribute value of the second status control attribute is true, performing the operation of setting the attribute value of the second action status attribute to the second set value in the case that the attribute value of the second status control attribute is determined to be true, and not performing the operation of setting the attribute value of the second action status attribute to the second set value in the case that the attribute value of the second status control attribute is determined to be not true. That is, upon triggering of the first action, whether the attribute value of the second status control attribute is true is first determined. Where the attribute value of the second status control attribute is determined to be true, the attribute value of the second action status attribute is set to the second set value, and the attribute value of the second action status attribute is not operated in the case that the attribute value of the second status control attribute is not true.

Exemplarily, in some examples, prior to performing the operation of changing the attribute value of the first action status attribute from the first set value to the second set value, the method further includes: determining whether the attribute value of the second status control attribute is true, performing the operation of changing the attribute value of the first action status attribute from the first set value to the second set value in the case that the attribute value of the second status control attribute is determined to be true, not performing the operation of changing the attribute value of the first action status attribute from the first set value to the second set value in the case that the attribute value of the second status control attribute is determined to be not true. That is, upon triggering of the second action, whether the attribute value of the second status control attribute is true is first determined. Where the attribute value of the second status control attribute is determined to be true, the attribute value of the first action status attribute is changed from the first set value to the second set value, and the attribute value of the second action status attribute is not operated in the case that the attribute value of the second status control attribute is not true.

Exemplarily, in other examples, prior to performing the operation of changing the attribute value of the first action status attribute from the first set value to the second set value, the method further includes: determining whether the attribute value of the first status control attribute is true, performing the operation of changing the attribute value of the first action status attribute from the first set value to the second set value in the case that the attribute value of the first status control attribute is determined to be true, not performing the operation of changing the attribute value of the first action status attribute from the first set value to the second set value in the case that the attribute value of the first status control attribute is determined to be not true. That is, upon triggering of the second action, whether the attribute value of the first status control attribute is true is first determined. Where the attribute value of the first status control attribute is determined to be true, the attribute value of the first action status attribute is changed from the first set value to the second set value, and the attribute value of the second action status attribute is not operated in the case that the attribute value of the first status control attribute is not true.

Exemplarily, in the present disclosure, the attribute value of the second action status attribute may be operated upon execution of the first action only in the case that the attribute value of the first status control attribute is true, and the attribute value of the first action status attribute may be operated upon execution of the second action only in the case that the attribute value of the second status control attribute is true. That is, upon execution of the first action, it is necessary to determine whether the attribute value of the first status control attribute is true. Where the attribute value of the first status control attribute is true, the attribute value of the second action status attribute is changed to the second set value (in this case, the attribute value of the first action status attribute is the first set value). Where the attribute value of the first status control attribute is not true (i.e., false), the operation of changing the attribute value of the second action status attribute is not necessary to perform; upon execution of the second action, it is necessary to determine whether the attribute value of the second status control attribute is true. Where the attribute value of the second status control attribute is true, the attribute value of the first action status attribute is changed to the second set value (in this case, the attribute value of the second action status attribute is the first set value). Where the attribute value of the second status control attribute is not true (i.e., false), the operation of changing the attribute value of the first action status attribute is not necessary to perform.

Exemplarily, the sensor data may be received by various sensors to determine the second data resource (which may also be referred to as the second subject resource). Exemplarily, the second data resource may further be the concentration of carbon monoxide, the concentration of PM2.5, the temperature, or the like.

Exemplarily, the first data resource and the second data resource are different. In some examples, the first data resource may be the concentration of PM2.5, and the second data resource may be the concentration of carbon monoxide.

Exemplarily, the application entity (e.g., the sensor) may transmit data to the common service entity to update the second data resource.

It should be noted that it is no sequence to trigger the first action and the second action, for example. Exemplarily, the first action may be triggered in the case that the first data resource satisfies the first trigger condition, and the attribute value of the second action status attribute satisfies the first dependency condition and/or the attribute value of the second action time attribute satisfies the second dependency condition; the second action may be triggered in the case that the second data resource satisfies the second trigger condition. It should be noted that the second action may be triggered in the case that the second action resource includes the corresponding dependency condition, the second data resource satisfies the second trigger condition, and the dependency condition corresponding to the second action resource is satisfied. Exemplarily, in some examples, the second action may be triggered, and then the first action may be triggered; in other examples, the first action may be triggered, and then the second action may be triggered.

Exemplarily, the second action resource further includes the second action time attribute, and the second action time attribute indicates the time parameter associated with the second action. The execution method further includes: setting the attribute value of the second action time attribute upon triggering of the second action. The fashion of setting the attribute value of the second action time attribute may be the same as the fashion of setting the attribute value of the first action time attribute, which is not repeated herein.

It is noted that, each time the first action is triggered, the attribute value of the first action time attribute may be reset. That is, the attribute value of the first action time attribute is cleared to 0. The attribute value of the second action time attribute may further be reset each time the second action is triggered. That is, the attribute value of the second action time attribute is cleared to 0.

Moreover, in an embodiment of the method of executing the action, for details about the first action resource and the second action resource, reference may be made to the related description in the embodiment of the method of creating the action resource, which is not repeated herein.

Figure 10:
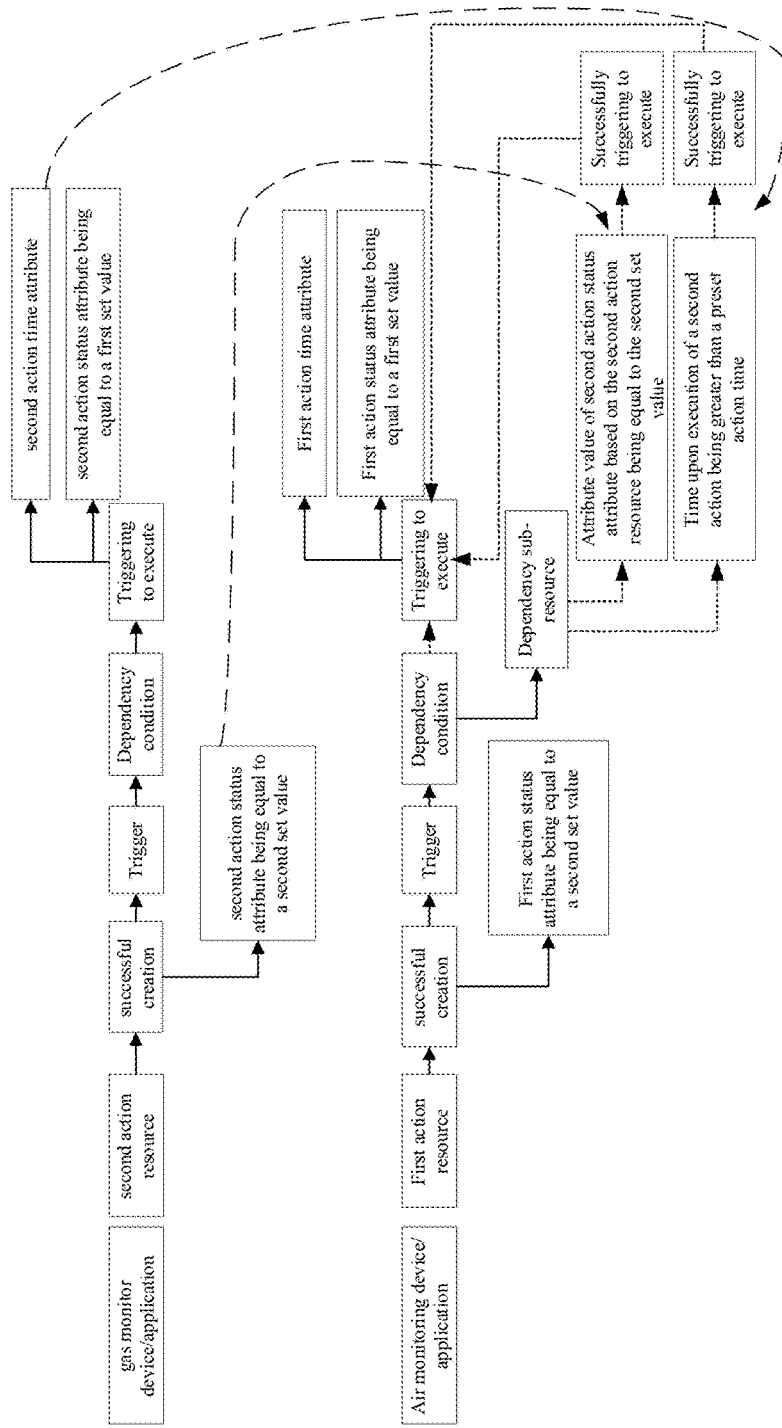
FIG. 10 is a schematic diagram of a process for creating and executing an action resource according to some embodiments of the present disclosure.

FIG. 10 illustrates a schematic diagram of a process for creating and executing an action resource according to some embodiments of the present disclosure. The example illustrated in FIG. 10 is an example of the action resource illustrated in Tables 1 to 4 described above.

Exemplarily, as illustrated in FIG. 10, the air monitoring device/application and the gas monitoring device/application transmit a registration request to the common service entity to achieve registration, and the common service entity may return a successful registration response to the air monitoring device/application and the gas monitoring device/application upon completion of the registration.

Then, the air monitoring device/application transmits the first creation request to the common service entity, and the common service entity may create the first action resource for the air monitoring device/application based on the first creation request in response to the common service entity passing the identity check of the air monitoring device/application. The common service entity may return the successful creation response to the air monitoring device/application in response to the first action resource creation being successfully created. In this case, the attribute value of the first action status attribute of the first action resource is the second set value (i.e., inactive), and the attribute value of the first action time attribute of the first action resource may be empty. Exemplarily, the first action resource is configured to trigger the first action for the first target resource.

The gas monitoring device/application transmits the second creation request to the common service entity, and the common service entity may create the second action resource for the gas monitoring device/application based on the second creation request in response to the common service entity passing the identity check of the gas monitoring device/application. The common service entity may return the successful creation response to the gas monitoring device/application in response to the second action resource creation being successfully created. In this case, the attribute value of the second action status attribute of the second action resource is the second set value (i.e., inactive), and the attribute value of the second action time attribute of the second action resource may be empty. Exemplarily, the second action resource is configured to trigger the second action for the second target resource, and the second target resource and the first target resource are the same.

Then, for the second action resource, the second action may be triggered in response to the second data resource satisfying the second trigger condition, and then, whether the dependency condition of the second action resource is satisfied is determined. As the second action resource does not include the dependency condition, the second action may be triggered to execute in the case that the second data resource satisfies the second trigger condition. That is, the operation of opening the window (i.e., the second action includes an opening operation) is triggered for the window (i.e., the second target resource). Upon triggering of the second action, the attribute value of the second action status attribute is set to the first set value (active), and the attribute value of the second action time attribute is set to clock to record the duration in response to the second action being performed.

For the first action resource, the first action resource includes two dependency sub-resources, one dependency sub-resource is based on that the attribute value of the second action status attribute of the second action resource is the second set value, and the other dependency sub-resource is based on that the time upon execution of the second action (i.e., the attribute value of the second action time attribute) is greater than the preset action time. When the first data resource satisfies the first trigger condition, whether the dependency condition of the first action resource is satisfied is determined. In the case that the attribute value of the second action status attribute of the second action resource is the second set value, the triggering operation is successfully performed, such that execution of the first action is triggered; in the case that the attribute value of the second action status attribute of the second action resource is the first set value, whether the attribute value of the second action time attribute is greater than the preset action time is determined, and the triggering operation is successfully performed in response to the attribute value of the second action time attribute being greater than the preset action time, such that the first action is triggered to perform; in the case that the attribute value of the second action status attribute of the second action resource is the first set value, and the attribute value of the second action time attribute is less than or equal to the preset action time, the triggering operation is failed to perform, such that the first action is not performed. Exemplarily, the attribute value of the first action status attribute is set to the first set value in response to the first action being triggered. In this case, the attribute value of the first action time attribute begins clocking to record the duration upon execution of the first action.

In the methods for creating and executing the action resource according to the present disclosure, the conflict problems of the action resources may be resolved based on the dependency conditions associated with the action status attributes by increasing the action status attributes in the action resources.

Figure 11:
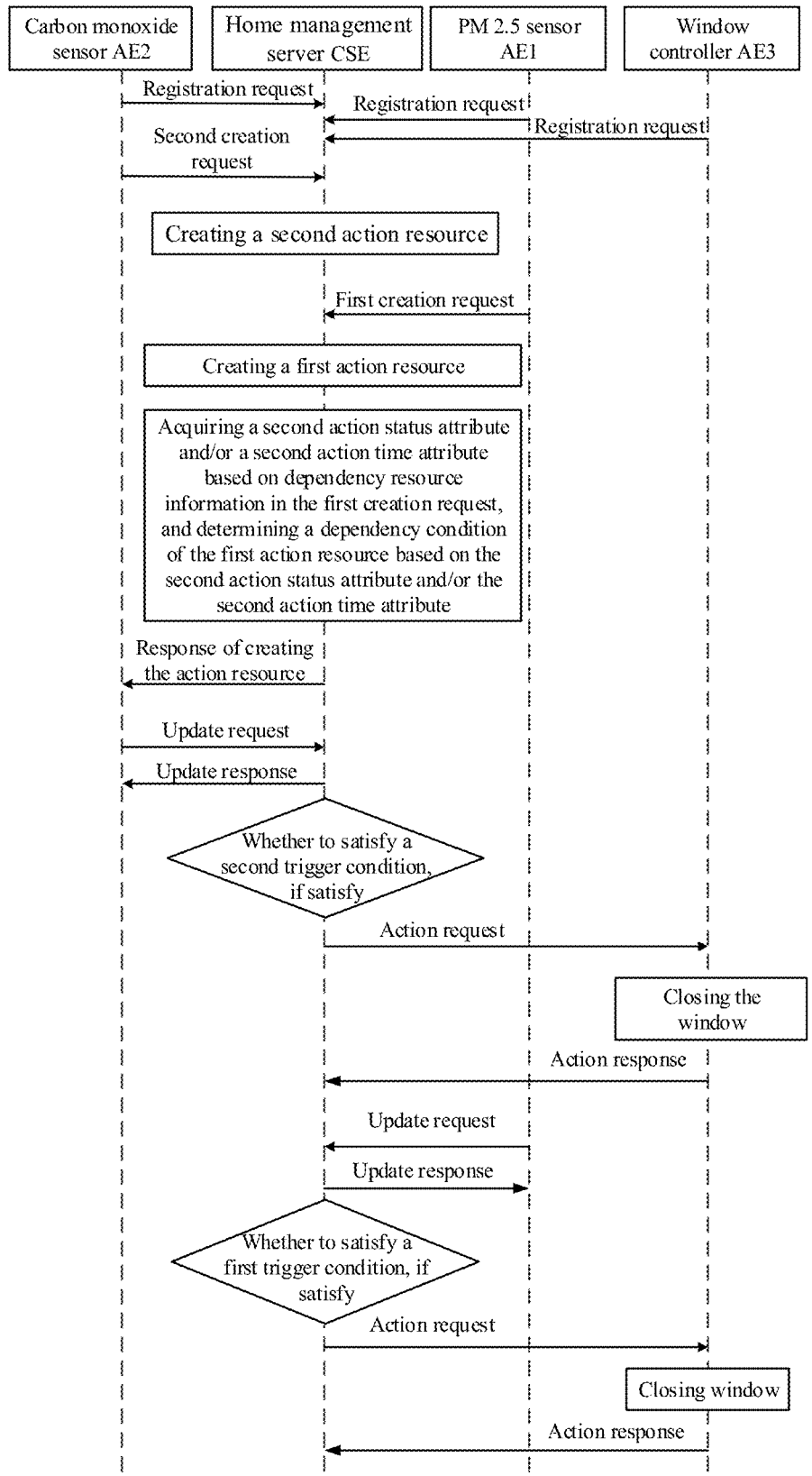
FIG. 11 is a schematic diagram of an illustrative example of an operation of triggering for a target resource according to some embodiments of the present disclosure.

FIG. 11 illustrates a schematic diagram of an illustrative example of an operation of triggering for a target resource according to some embodiments of the present disclosure. The example illustrated in FIG. 11 is an example of the action resource illustrated in Tables 1 to 4.

Exemplarily, as illustrated in FIG. 11, a PM 2.5 sensor AE1 (e.g., the air monitoring device), a carbon monoxide sensor AE2 (e.g., the gas monitoring device), and a window controller AE3 are registered to the home management server CSE (i.e., the common service entity).

In the process of creating the action resource, the carbon monoxide sensor AE2 may transmit the second creation request of the second action resource to the home management server CSE, and the second creation request includes an action trigger body (the carbon monoxide sensor AE2), the second target resource (the window), the second trigger condition (the concentration of carbon monoxide being greater than the preset threshold B), and a control action (opening the window).

Based on the second creation request transmitted by the carbon monoxide sensor AE2, the home management server CSE may create the second action resource. In some embodiments, prior to creating the second action resource, it may be determined whether other action resource in the home management server CSE for the same second target resource is present. In the absence of other action resources for the same second target resource, the second action resource may be created according to the create request transmitted by the carbon monoxide sensor AE2.

The PM 2.5 sensor AE1 may transmit the first creation request of the first action resource to the home management server CSE, and the first creation request includes the action trigger body (the PM 2.5 sensor AE1), the first target resource (the window), the first trigger condition (the concentration of PM 2.5 being greater than the preset threshold A), the dependency condition (the attribute value of the second action status attribute being the second preset value, or the attribute value of the second action time attribute being greater than the preset action time), and the control action (closing the window).

Based on the first creation request transmitted by the PM 2.5 sensor AE1, the home management server CSE may create the first action resource. It should be noted that the PM 2.5 sensor AE1 transmits the first creation request to the home management server CSE in response to the second action resource being created to request the creation of the first action resource. Where the first creation request does not include the dependency condition, the home management server CSE determines that the first action resource to be created may conflict with the already-existed second action resource, and the home management server CSE may refuse to create the first action resource, i.e., the first action resource fails to create.

Exemplarily, upon creation of the first action resource, the home management service CSE may return the successful creation response of the action resource to the PM 2.5 sensor AE1 to indicate that the first action resource creation is successfully created; upon creation of the second action resource, the home management service CSE may return the successful creation response of the action resource to the carbon monoxide sensor AE2 to indicate that the second action resource creation is successfully created.

In the operation process, the home management server CSE may receive an update request from the carbon monoxide sensor AE2 to update the corresponding second data resource (i.e., the second body resource). The update request may include data of the carbon monoxide content currently detected by the carbon monoxide sensor AE2. The home management server CSE may transmit a corresponding update response to the carbon monoxide sensor AE2 upon receipt of the update request transmitted by the carbon monoxide sensor AE2.

The home management server CSE may determine whether the data received from the carbon monoxide sensor AE2 satisfies the trigger condition of the second action resource (i.e., the second trigger condition). Where the second data resource satisfies the trigger condition of the second action resource, the home management server CSE may transmit the action request to the window controller AE3, and notify the window controller AE3 to perform the operation of opening the window. Upon execution of the opening operation, the window controller AE3 may transmit an action response to the home management server CSE.

The home management server CSE may further receive the update request from the PM 2.5 sensor AE1 to update the corresponding first data resource (i.e., the first body resource). Exemplarily, the update request includes the concentration of PM 2.5 currently detected by the PM 2.5 sensor AE1. In some embodiments, such update request may be transmitted periodically at a preset frequency, or may be transmitted in response to the change of detection data. Exemplarily, the update request may be transmitted to the home management server CSE in response to the detection data being greater than the preset threshold A. The home management server CSE may transmit the corresponding update response to the PM 2.5 sensor AE1 in response to the update request transmitted by the PM 2.5 sensor AE1 being received.

The home management server CSE may determine whether the trigger condition (i.e., the first trigger condition) of the first action resource is satisfied based on the concentration of PM 2.5 in the updated first data resource, and determine whether the dependency condition of the first action resource is satisfied based on the second action status attribute and the second action time attribute (including the first dependency condition and/or the second dependency condition described in the above embodiments). Where both the trigger condition and the dependency condition of the first action resource are satisfied, the action request may be transmitted to the window controller AE3. The window controller AE3 may perform the operation of closing the window based on the received operation request. In the case that the closing operation is performed, the window controller AE3 may transmit the action response to the server CSE.

It is noted that in the present disclosure, the update request may include requesting the home management server CSE to update or set any of the attribute value in the first action resource or the second action resource. Exemplarily, any of the attribute value of the first action status attribute in the first action resource, the attribute value of the first action time attribute, the attribute value of the first reverse action attribute, the attribute value of the first status control attribute may be updated or set, which is not limited in the present disclosure.

Figure 12:
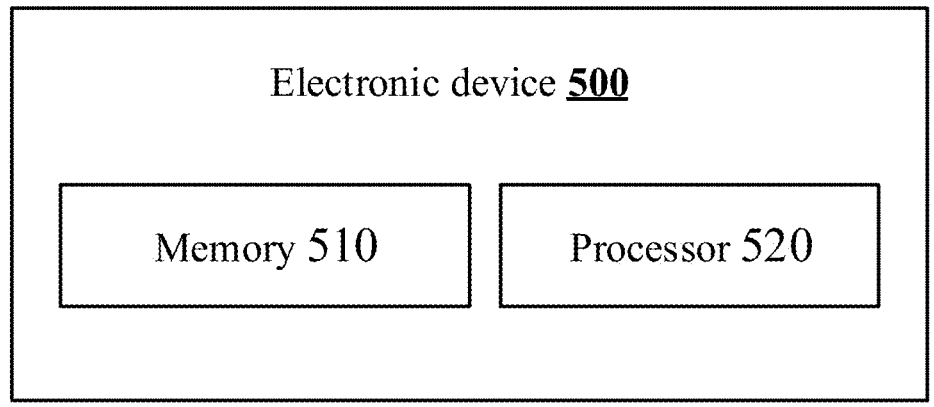
FIG. 12 is a schematic diagram of an electronic device according to some embodiments of the present disclosure.

Some embodiments of the present disclosure further provide an electronic device. FIG. 12 is a schematic diagram of an electronic device according to some embodiments of the present disclosure.

Exemplarily, as illustrated in FIG. 12, the electronic device 500 may include a memory 510 and a processor 520. It should be noted that the components of the electronic device 500 illustrated in FIG. 12 are merely exemplary, and are not limited. The electronic device 500 may further include other components according to the actual application requirements.

Exemplarily, the memory 510 is configured to non-transitorily store computer-readable instructions. The processor 520, when executing the computer-readable instructions, is caused to perform the method for creating the action resource as described above.

Exemplarily, the memory 510, the processor 520, and the like of may communicate over a network connection. The network may include a wireless network, a wired network, and/or any combination of wireless and wired networks. The network may include a local area network, the Internet, a telecommunications network, the Internet of things based on the Internet and/or the telecommunications network, and/or any combination of the above networks. The wired network may communicate by, for example, twisted pair, coaxial cable, or fiber optic transmission, and the wireless network may take the form of, for example, a 3G/4G/5G mobile communication network, Bluetooth, Zigbee, or Wi-Fi. The type and function of the network is not limited herein.

Exemplarily, the processor 520 may control other components in the electronic device 500 to perform desired functions. The processor 520 may be a central processing unit (CPU), a microprocessor, or other assemblies having data processing capabilities and/or program execution capabilities. The CPU may be in an X86 or ARM architecture or the like.

Exemplarily, the memory 510 may include any combination of one or more computer program products, and the computer program product may include various forms of computer-readable storage media, such as a volatile memory and/or non-volatile memory. The volatile memory may include a random-access memory (RAM) and/or a cache memory, and the like. The non-volatile memory may include a read-only memory (ROM), a hard disk, an erasable programmable read-only memory (EPROM), a portable compact disc read-only memory (CD-ROM), an USB memory, a flash memory, and the like. The computer-readable storage medium may store one or more computer-readable instructions, and the processor 520 may execute the computer-readable instructions to implement various functions of the electronic device 500. The storage media may further store various applications and various data.

Exemplarily, for details about the process of creating the action resource performed by the electronic device 500, reference may be made to the related description in the embodiment of the method for creating the action resource, which is not repeated herein.

Some embodiments of the present disclosure further provide an electronic device. Exemplarily, the electronic device may include a memory and a processor. The memory is configured to non-transitorily store computer-readable instructions; and the processor is configured to execute the computer-readable instructions, and the processor, when executing the computer computer-readable instructions, is caused to perform the method for executing the action resource described above. It should be noted that for details about the memory and the processor, reference may be made to the above description, which is not repeated herein; and for details about the process of the operation of executing the action resource by the electronic device, reference may be made to the related description in the embodiment of the method for executing the action, which is not repeated herein.

Figure 13:
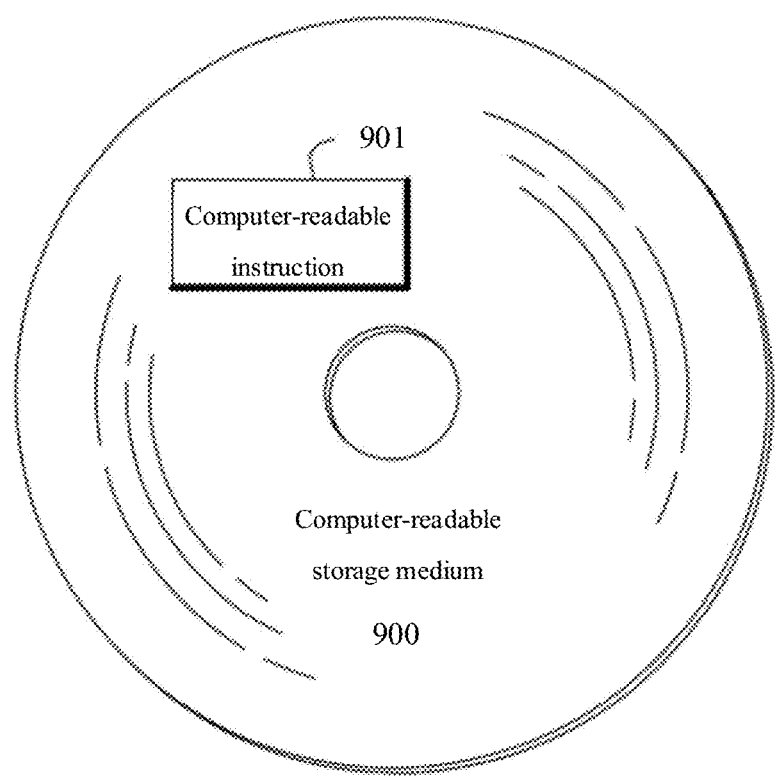
FIG. 13 is a schematic diagram of a computer-readable storage medium according to some embodiments of the present disclosure.

Some embodiments of the present disclosure further provide a computer-readable storage medium. FIG. 13 is a schematic diagram of a computer-readable storage medium according to some embodiments of the present disclosure. Exemplarily, as illustrated in FIG. 13, one or more computer-readable instructions 901 may be non-transitorily stored on the computer-readable storage medium 900. Exemplarily, when the computer-readable instructions 901 are executed by a computer, the computer may be caused to perform the one or more of the processes of the method for creating the action resource and the method for executing the action described above.

Exemplarily, the computer-readable storage medium 900 may be implemented in the electronic device, for example, may be the memory in the electronic device.

Exemplarily, for details about the computer-readable storage medium 900, reference may be made to the description of the memory of the electronic device in any of the above embodiment, which is not repeated herein.

The following points shall be noted for the present disclosure.

(1) The accompanying drawings of the embodiments of the present disclosure are merely referred to the structures involved in the embodiments of the present disclosure, and other structures may be referred to the general design.

(2) For clearer description, the thickness and dimension of the layers or structures are exaggerated in the accompanying drawings used to describe the embodiments of the present invention. It should be understood that in the case that an element such as a layer, film, region or substrate is referred to as being "under" or "below" another element, the element may be directly "under" or "below" the other element, or the intermediate element may be present.

(3) The embodiments of the present disclosure and the features of the embodiments may be combined with each other to generate new embodiments without conflict.

The above description is merely specific embodiments of the present disclosure, the scope of protection of the present disclosure should not be limited, and the scope of the disclosure should be determined with reference to the appended claims.

What is claimed is:

1. A method for creating an action resource, comprising:
   receiving a first creation request, wherein the first creation request comprises a first target resource; and
   creating a first action resource based on the first creation request, wherein the first action resource is configured to trigger a first action for the first target resource;
   wherein creating the first action resource comprises:
   creating a first action status attribute for the first action resource, wherein the first action status attribute indicates a status of the first action;
   creating a first action time attribute for the first action resource, wherein the first action time attribute indicates a time parameter related to the first action;
   creating a first status automatic control time attribute for the first action resource, wherein an attribute value of the first action status attribute comprises a first set value and a second set value, the first set value and the second set value being opposite to each other, and the first status automatic control time indicates changing the attribute value of the first action status attribute from the first set value to the second set value in the case that the attribute value of the first action status attribute is the first set value, and an attribute value of the first action time attribute is greater than or equal to an attribute value of the first status automatic control time attribute.

2. The method according to claim 1, wherein creating the first action resource further comprises: creating the first action time attribute for the first action resource, and the method further comprises:
   receiving a second creation request, wherein the second creation request comprises a second target resource; and
   creating a second action resource based on the second creation request, wherein the second action resource is configured to trigger a second action for the second target resource, the second action being triggered for the second target resource in the case that a second trigger condition is satisfied;
   wherein creating the second action resource comprises:
   creating a second action status attribute for the second action resource, wherein the second action status attribute indicates a status of the second action.

3. The method according to claim 2, wherein creating the second action resource further comprises: creating a second action time attribute for the second action resource;
   wherein the second action time attribute indicates a time parameter related to the second action.

4. The method according to claim 2, wherein the first target resource and the second target resource are the same, and the first action and the second action are in conflict with each other.

5. The method according to claim 3, wherein
   the first creation request further comprises dependency resource information; and
   creating the first action resource further comprises:
   creating a first dependency sub-resource for the first action resource based on the dependency resource information, wherein the first dependency sub-resource comprises a first dependency condition, the first dependency condition being related to the second action status attribute, and the first action is triggered for the first target resource in the case that a first trigger condition and the first dependency condition are simultaneously satisfied; or creating a second dependency sub-resource for the first action resource based on the dependency resource information, wherein the second dependency sub-resource comprises a second dependency condition, the second dependency condition being related to the second action time attribute, and the first action is triggered for the first target resource in the case that the first trigger condition and the second dependency condition are simultaneously satisfied; or creating the first dependency sub-resource and the second dependency sub-resource for the first action resource based on the dependency resource information, wherein the first dependency sub-resource comprises the first dependency condition, the second dependency sub-resource comprises the second dependency condition; and the first dependency condition is related to the second action status attribute, the second dependency condition is related to the second action time attribute, and the first action is triggered for the first target resource in the case that at least one of the first dependency condition and the second dependency condition, and the first trigger condition are simultaneously satisfied.

6. The method according to claim 5, wherein the method meets at least one of the following requirements:

wherein the first dependency condition is that the attribute value of the second action status attribute and a first set value satisfy a first preset logical relationship, the first set value being active or inactive; and the second dependency condition is that an attribute value of the second action time attribute and a preset action time satisfy a second preset logical relationship; or wherein creating the first action resource further comprises:

creating a first opposite action attribute and a first status control attribute for the first action resource;

creating the second action resource further comprises:

creating a second opposite action attribute and a second status control attribute for the second action resource;

the first opposite action attribute indicates an identification code of the second action resource, and the second opposite action attribute indicates an identification code of the first action resource; and the first status control attribute indicates whether to change an attribute value of the first action status attribute or an attribute value of the second action status attribute, and the second status control attribute indicates whether to change an attribute value of the second action status attribute or an attribute value of the first action status attribute.

7. The method according to claim 2, wherein the first creation request further comprises conflict policy resource information; and creating the first action resource further comprises:

creating a conflict policy sub-resource for the first action resource based on the conflict policy resource information.

8. The method according to claim 7, wherein creating the first action resource further comprises:

creating a first dependency sub-resource for the first action resource in the case that the second target resource, the second action, and the conflict policy sub-resource satisfy a matching condition, wherein the first dependency sub-resource comprises a first dependency condition, the first dependency condition being related to the second action status attribute, and the first action is triggered for the first target resource in the case that the first dependency condition and the first trigger condition are simultaneously satisfied; or creating the first action resource further comprises:

creating a second dependency sub-resource for the first action resource in the case that the second target resource, the second action, and the conflict policy sub-resource satisfy the matching condition, wherein the second dependency sub-resource comprises a second dependency condition, the second dependency condition being related to the second action time attribute, and the first action is triggered for the first target resource in the case that the second dependency condition and the first trigger condition are simultaneously satisfied; or creating the first action resource further comprises:

creating the first dependency sub-resource and the second dependency sub-resource for the first action resource in the case that the second target resource, the second action, and the conflict policy sub-resource satisfy the matching condition, wherein the first dependency sub-resource comprises the first dependency condition, the first dependency condition being related to the second action status attribute, and the second dependency sub-resource comprises the second dependency condition, the second dependency condition being related to the second action time attribute, the first action is triggered for the first target resource in the case that at least one of the first dependency condition and the second dependency condition, and the first trigger condition are simultaneously satisfied.

9. The method according to claim 7, wherein creating the conflict policy sub-resource for the first action resource comprises:

creating a conflict target resource identification attribute and a conflict execution method attribute for the first action resource, wherein the conflict target resource identification attribute indicates an identification code of the first target resource, the conflict execution method attribute indicates an action conflicting with the first action; and satisfying a matching condition is that an identification code of the second target resource is the same as the conflict target resource identification attribute, and the second action is the same as the action represented by the conflict execution method attribute.

10. A method for performing an action, comprising:

determining a first action resource, wherein the first action resource is configured to trigger a first action for a first target resource, and the first action resource comprises a first action status attribute, a first action time attribute, and a first status automatic control time attribute, wherein the first action status attribute indicates a status of the first action, and the first action time attribute indicates a time parameter related to the first action;

triggering the first action for the first target resource;

setting an attribute value of the first action status attribute to a first set value in response to triggering the first action, and setting an attribute value of the first action time attribute in response to triggering the first action;

acquiring an attribute value of the first action time attribute; and determining whether the attribute value of the first action time attribute is greater than or equal to an attribute value of the first status automatic control time attribute, and changing an attribute value of the first action status attribute from the first set value to a second set value in the case that the attribute value of the first action time attribute is greater than or equal to the attribute value of the first status automatic control time attribute, wherein the first set value and the second set value are opposite to each other.

11. The method according to claim 10, wherein triggering the first action for the first target resource comprises:

receiving a first data resource; and triggering the first action for the first target resource in the case that the first data resource satisfies a first trigger condition.

12. The method according to claim 10, wherein the first action resource further comprises a first dependency sub-resource and a second dependency sub-resource, the first dependency sub-resource comprising a first dependency condition, the second dependency sub-resource comprising a second dependency condition; and triggering the first action for the first target resource comprises: receiving a first data resource; acquiring a second action status attribute and a second action time attribute of a second action resource, wherein the second action resource is configured to trigger a resource of a second action for a second target resource, the second action resource comprises the second action status attribute and the second action time attribute, the second action status attribute indicates a status of the second action, and the second action time attribute indicates a time parameter related to the second action; triggering the first action for the first target resource in the case that the first data resource satisfies the first trigger condition, and an attribute value of the second action status attribute satisfies the first dependency condition and/or the attribute value of the second action status attribute satisfies the second dependency condition; or wherein setting the attribute value of the first action time attribute comprises: establishing an action execution timer to start timing in response to triggering the first action, and employing a time value of the action execution timer as the attribute value of the first action time attribute.

13. The method according to claim 10, wherein the first action resource further comprises a first dependency sub-resource, the first dependency sub-resource comprising a first dependency condition; and triggering the first action for the first target resource comprises:

receiving a first data resource;

acquiring a second action status attribute of a second action resource, wherein the second action resource is configured to trigger a resource of a second action for a second target resource, the second action resource comprises the second action status attribute, and the second action status attribute indicates a status of the second action; and triggering the first action for the first target resource in the case that the first data resource satisfies a first trigger condition, and an attribute value of the second action status attribute satisfies the first dependency condition; or the first action resource further comprises a second dependency sub-resource, the second dependency sub-resource comprising a second dependency condition; and triggering the first action for the first target resource comprises:

receiving a first data resource;

acquiring a second action time attribute of a second action resource, wherein the second action resource is configured to trigger the resource of the second action for the second target resource, the second action resource comprises the second action time attribute, and the second action time attribute indicates a time parameter related to the second action; and triggering the first action for the first target resource in the case that the first data resource satisfies the first trigger condition, and the attribute value of the second action status attribute satisfies the second dependency condition.

14. The method according to claim 13, wherein the method meets at least one of the following requirements:

wherein the first dependency condition is that the attribute value of the second action status attribute and the first set value satisfy a first preset logical relationship, the first set value being active or inactive; and the second dependency condition is that the attribute value of the second action time attribute and a preset action time satisfy a second preset logical relationship; or wherein the first target resource and the second target resource are the same, and the first action and the second action conflict with each other.

15. The method according to claim 13, further comprising:

setting the attribute value of the second action status attribute to a second set value in response to triggering the first action, wherein the first set value and the second set value are opposite to each other;

determining the second action resource;

receiving a second data resource; and triggering the second action for the second target resource in the case that the second data resource satisfies a second trigger condition, and changing the attribute value of the second action status attribute from the second set value to the first set value and changing the attribute value of the first action status attribute from the first set value to the second set value in response to triggering the second action.

16. The method according to claim 15, wherein the first action resource further comprises a first opposite action attribute and a first status control attribute, and the second action resource further comprises a second opposite action attribute and a second status control attribute; wherein the first opposite action attribute indicates an identification code of the second action resource, and the second opposite action attribute indicates an identification code of the first action resource; and prior to performing the operation of setting the attribute value of the second action status attribute to the second set value, the method further comprises:

determining whether an attribute value of the first status control attribute is true, performing the operation of setting the attribute value of the second action status attribute to the second set value in the case that the attribute value of the first status control attribute is determined to be true, and not performing the operation of setting the attribute value of the second action status attribute to the second set value in the case that the attribute value of the first status control attribute is determined to be not true; and prior to performing the operation of changing the attribute value of the first action status attribute from the first set value to the second set value, the method further comprises:

determining whether the attribute value of the second status control attribute is true, performing the operation of changing the attribute value of the first action status attribute from the first set value to the second set value in the case that the attribute value of the second status control attribute is determined to be true, and not performing the operation of changing the attribute value of the first action status attribute from the first set value to the second set value in the case that the attribute value of the second status control attribute is determined to be not true;

or prior to performing the operation of setting the attribute value of the second action status attribute to the second set value, the method further comprises:

determining whether the attribute value of the second status control attribute is true, performing the operation of setting the attribute value of the second action status attribute to the second set value in the case that the attribute value of the second status control attribute is determined to be true, and not performing the operation of setting the attribute value of the second action status attribute to the second set value in the case that the attribute value of the second status control attribute is determined to be not true; and prior to performing the operation of changing the attribute value of the first action status attribute from the first set value to the second set value, the method further comprises:

determining whether the attribute value of the first status control attribute is true, performing the operation of changing the attribute value of the first action status attribute from the first set value to the second set value in the case that the attribute value of the first status control attribute is determined to be true, and not performing the operation of changing the attribute value of the first action status attribute from the first set value to the second set value in the case that the attribute value of the first status control attribute is determined to be not true.

17. An electronic device, comprising:

a memory configured to non-transitorily store a computer-readable instruction; and a processor configured to execute the computer-readable instruction, wherein the processor, when executing the computer-readable instruction, is caused to perform the method as defined in claim 1 or a method which comprises:

determining a first action resource, wherein the first action resource is configured to trigger a first action for a first target resource, and the first action resource comprises a first action status attribute, a first action time attribute, and a first status automatic control time attribute, wherein the first action status attribute indicates a status of the first action, and the first action time attribute indicates a time parameter related to the first action;

triggering the first action for the first target resource;

setting an attribute value of the first action status attribute to a first set value in response to triggering the first action, and setting an attribute value of the first action time attribute in response to triggering the first action;

acquiring an attribute value of the first action time attribute; and determining whether the attribute value of the first action time attribute is greater than or equal to an attribute value of the first status automatic control time attribute, and changing an attribute value of the first action status attribute from the first set value to a second set value in the case that the attribute value of the first action time attribute is greater than or equal to the attribute value of the first status automatic control time attribute, wherein the first set value and the second set value are opposite to each other.

\* \* \* \* \*